United States Patent
Nakamura et al.

(10) Patent No.: US 11,526,069 B2
(45) Date of Patent: Dec. 13, 2022

(54) IMAGE CAPTURING APPARATUS HAVING HIGH OPERABILITY

(71) Applicant: CANON KABUSHIKI KAISHA, Tokyo (JP)

(72) Inventors: Yuta Nakamura, Tokyo (JP); Hideki Toichi, Tokyo (JP); Kazuo Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 16/924,380

(22) Filed: Jul. 9, 2020

(65) Prior Publication Data
US 2021/0055637 A1 Feb. 25, 2021

(30) Foreign Application Priority Data
Aug. 20, 2019 (JP) .............................. JP2019-150318

(51) Int. Cl.
*G03B 17/56* (2021.01)
*H04N 5/225* (2006.01)
(Continued)

(52) U.S. Cl.
CPC ........... *G03B 17/563* (2013.01); *G03B 17/14* (2013.01); *H04N 5/2252* (2013.01);
(Continued)

(58) Field of Classification Search
CPC ...... G03B 17/563; G03B 17/14; G03B 17/56; H04N 5/2252; H04N 5/225251;
(Continued)

(56) References Cited

U.S. PATENT DOCUMENTS

| 5,917,545 | A | * | 6/1999 | Kowno | ................ | H04N 5/2251 |
|  |  |  |  |  |  | 348/E5.025 |
| 6,272,290 | B1 | * | 8/2001 | Mogamiya | ........... | H04N 5/2251 |
|  |  |  |  |  |  | 348/E5.042 |

(Continued)

FOREIGN PATENT DOCUMENTS

| JP | 2015034914 A | 2/2015 |
| JP | 2017076924 A | 4/2017 |

*Primary Examiner* — Timothy J Henn
(74) *Attorney, Agent, or Firm* — Rossi, Kimms & McDowell LLP

(57) ABSTRACT

An image capturing apparatus having a high operability irrespective of whether an accessory is attached to an apparatus body. The apparatus body includes a first connection section connected to the accessory, a first operation member disposed in a surface different from a surface where the first connection section is provided, and a second operation member disposed in the surface where the first connection section is provided. The accessory includes a second connection section which can be connected to the first connection section, and a third operation section disposed in a surface different from the surface where the second connection section is provided and is located in the vicinity of the second operation member in a state in which the accessory is attached to the apparatus body. The second operation member and the third operation member have at least one same function.

6 Claims, 34 Drawing Sheets

(51) Int. Cl.
*G03B 17/14* (2021.01)
*H04N 5/907* (2006.01)

(52) U.S. Cl.
CPC ..... *H04N 5/2254* (2013.01); *H04N 5/225251* (2018.08); *H04N 5/907* (2013.01)

(58) Field of Classification Search
CPC .. H04N 5/2254; H04N 5/907; H04N 5/22521; H04N 5/2257; H04N 5/772
See application file for complete search history.

(56) References Cited

U.S. PATENT DOCUMENTS

| | | | | |
|---|---|---|---|---|
| 6,873,367 | B1* | 3/2005 | Hirata | H04N 5/772 |
| | | | | 348/E5.025 |
| 8,792,050 | B2* | 7/2014 | Shinohara | H04N 5/22521 |
| | | | | 348/373 |
| 2006/0008262 | A1* | 1/2006 | Watanabe | G03B 17/08 |
| | | | | 396/25 |
| 2007/0268371 | A1* | 11/2007 | Misawa | H04N 5/2252 |
| | | | | 348/E5.026 |
| 2010/0060747 | A1* | 3/2010 | Woodman | H04N 5/225251 |
| | | | | 348/222.1 |
| 2013/0343736 | A1* | 12/2013 | Lai | G03B 17/08 |
| | | | | 396/29 |
| 2016/0295095 | A1* | 10/2016 | Jannard | H04N 5/2254 |

\* cited by examiner

IMAGE CAPTURING APPARATUS HAVING HIGH OPERABILITY

BACKGROUND OF THE INVENTION

Field of the Invention

The present invention relates to an image capturing apparatus having a high operability.

Description of the Related Art

There has been conventionally known an image capturing apparatus, such as a digital video camera, which includes an apparatus body, and a function expansion unit removably attached to an apparatus body thereof. Such an image capturing apparatus enables a user to selectively attach a desired function expansion unit thereto and hence is high in function expandability, thus capable of meeting various shooting needs, using the apparatus body which is single (see e.g. Japanese Laid-Open Patent Publication (Kokai) No. 2017-76924).

However, as a function expansion unit attached to an image capturing apparatus, there are envisaged a wide variety of function expansion units, large and small. For example, one function expansion unit is attached to the whole rear of the apparatus body and another one is attached to part of the rear of the same. On the other hand, in some cases, the image capturing apparatus is used without attaching a function expansion unit to the apparatus body. Therefore, the image capturing apparatus is demanded to have a high operability irrespective of whether a function expansion unit is attached to the apparatus body thereof. Further, when attaching a function expansion unit to the apparatus body, it is necessary to achieve positive electrical connection therebetween while avoiding damage to electrical contacts.

SUMMARY OF THE INVENTION

The present invention provides an image capturing apparatus having a high operability irrespective of whether a function expansion unit is attached to an apparatus body thereof. Further, the present invention provides an image capturing apparatus capable of achieving positive electrical connection between a function expansion unit and an apparatus body while avoiding damage to electrical contacts when attaching the function expansion unit to the apparatus body.

In a first aspect of the present invention, there is provided an image capturing apparatus including an apparatus body to which an accessory is removably attached, wherein the apparatus body comprises a first connection section which can be connected to the accessory, a first operation member which is disposed in a surface different from a surface where the first connection section is provided, and a second operation member disposed in the surface where the first connection section is provided, wherein the accessory comprises a second connection section which can be connected to the first connection section, and a third operation section which is disposed in a surface different from the surface where the second connection section is provided, and is located in the vicinity of the second operation member in a state in which the accessory is attached to the apparatus body, and wherein at least one function of the third operation member and at least one function of the second operation member are the same.

In a second aspect of the present invention, there is provided an image capturing apparatus including an apparatus body to which and from which a recording medium card can be inserted and removed, wherein the apparatus body comprises an accommodation section where a plurality of recording medium cards are accommodated, a recording media-accommodating cover which opens and closes the accommodation section by rotation thereof, a static pressure receiving unit which receives a force from the recording media-accommodating cover when the recording media-accommodating cover is in an open state, an urging unit which urges the recording media-accommodating cover in an opening direction, and an opening/closing detection unit which detects opening/closing of the recording media-accommodating cover, wherein an axis of a rotational shaft of the recording media-accommodating cover is substantially parallel to a main surface of a recording medium card accommodated in the accommodation section, and is orthogonal to an insertion/removal direction in which the recording medium card is inserted into or removed from the accommodation section, and wherein the static pressure receiving unit, the urging unit, and the opening/closing detection unit are disposed at respective locations away from an area onto which one of the plurality of recording medium cards accommodated in the accommodation section, which is accommodated at a location closest to the rotational shaft, is projected in a direction perpendicular to the recording medium card.

In a third aspect of the present invention, there is provided an image capturing apparatus including an apparatus body to which an accessory is removably attached, wherein the apparatus body comprises an accommodation section provided in a rear surface, for accommodating a battery, a connector provided in the rear surface, for being electrically connected to the accessory, a first attachment portion provided in a top surface, for mechanically connecting the accessory thereto, and a second attachment portion provided in the rear surface, for mechanically connecting the accessory thereto, and wherein the connector is disposed in the rear surface toward the top surface than the accommodation section.

In a fourth aspect of the present invention, there is provided an image capturing apparatus including an apparatus body to which an accessory is removably attached, wherein the apparatus body comprises an accommodation section provided in a rear surface, for accommodating a battery, a through hole formed in the accommodation section, a connector provided in the rear surface, for being electrically connected to the accessory, and an attachment portion provided in a top surface, for mechanically connecting the accessory thereto, wherein the accessory comprises an insertion portion which is inserted into the accommodation section when the accessory is attached to the apparatus body, and wherein the accessory is fitted to the attachment portion, and is fixed to the apparatus body, by fixing of a first fastening member inserted through the through hole to the insertion portion, thereby causing the insertion portion to be fixed to the accommodation section.

In a fifth aspect of the present invention, there is provided an image capturing apparatus including an apparatus body to which an accessory is removably attached, wherein the apparatus body comprises a circuit board on which a connector is mounted, the connector being electrically connected to the accessory, and wherein the circuit board is attached to the apparatus body via an elastic member.

According to the present invention, it is possible to provide an image capturing apparatus having a high operability irrespective of whether a function expansion unit is attached to an apparatus body thereof. Further, it is possible to provide an image capturing apparatus capable of achieving positive electrical connection between a function expansion unit and an apparatus body while avoiding damage to electrical contacts when attaching the function expansion unit to the apparatus body.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
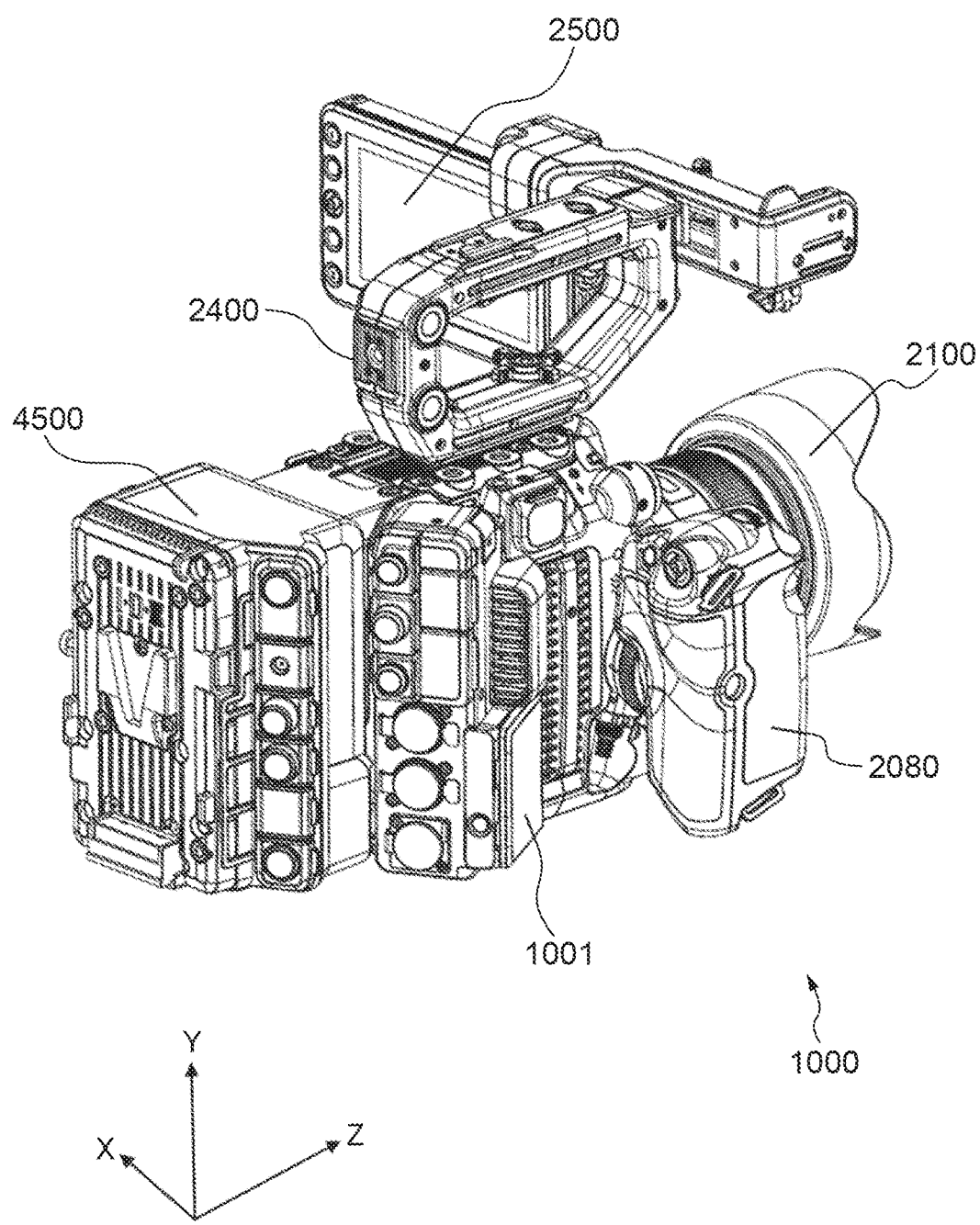
FIG. 1 is a perspective view showing the appearance of an image capturing system according to an embodiment of the present invention.
Figure 2:
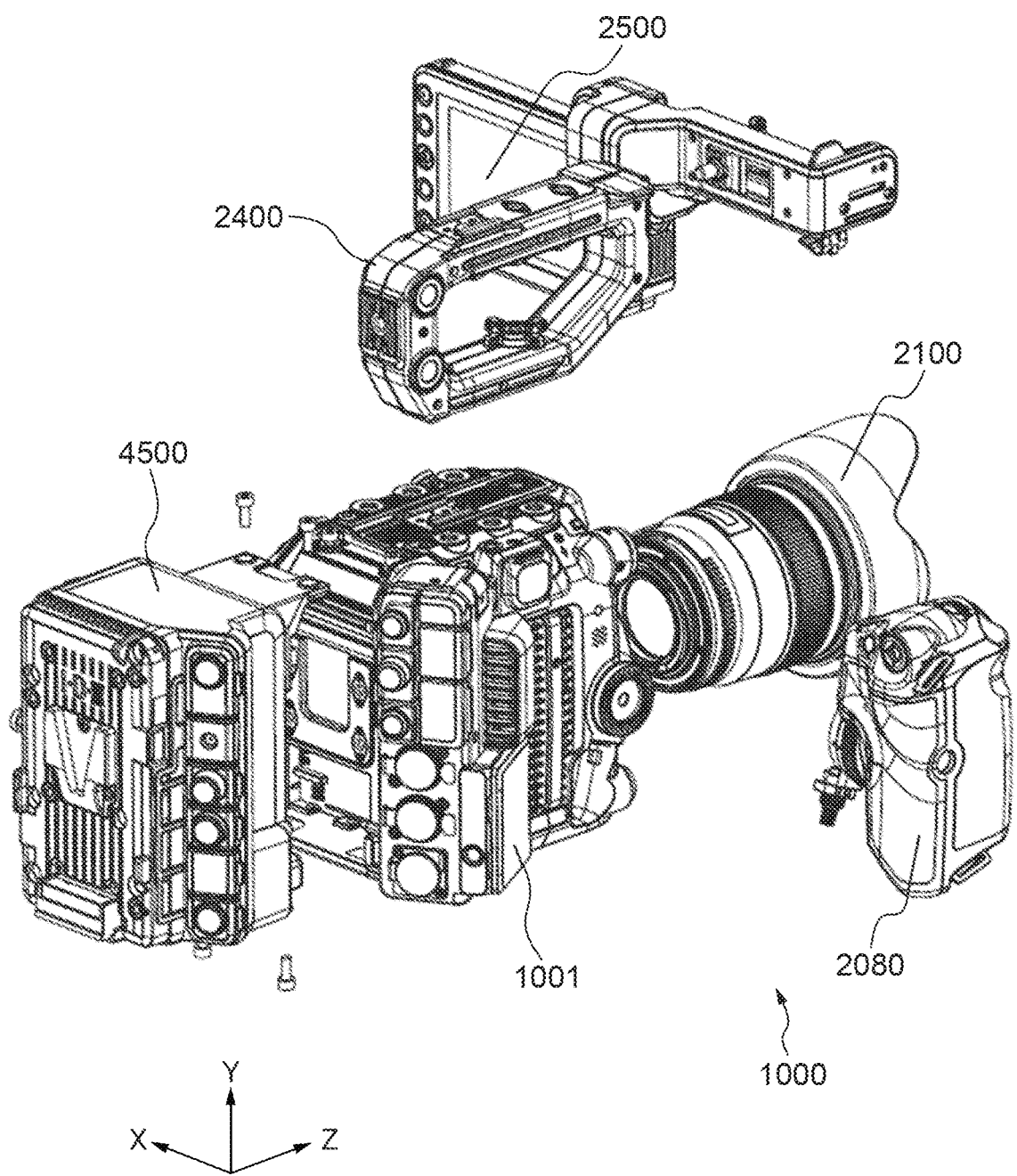
FIG. 2 is a perspective view showing the appearance of the image capturing system in a state in which an image capturing apparatus body as a component of the image capturing system and expansion function units removably attached to the image capturing apparatus body are made separate from each other.

FIG. 1 is a perspective view showing the appearance of an image capturing system 1000 according to a first embodiment of the present invention. FIG. 2 is a perspective view of the image capturing system 1000 in a state in which an image capturing apparatus body 1001 as a component of the image capturing system 1000 and function expansion units removably attached to the image capturing apparatus body 1001 are made separate from each other. In the illustrated example, as the function expansion units (accessories) removably attached to the image capturing apparatus body 1001, there are shown a grip unit 2080, a lens barrel 2100, a large-sized expansion unit 4500, a handle 2400, and a panel unit 2500.

To make clear correspondence between the drawings of the image capturing system 1000, coordinate axes orthogonal to each other are set as shown in FIG. 1. A Z-axis is an axis representing a front-rear direction of the image capturing apparatus body 1001, and a direction from a rear side toward a front side of the image capturing apparatus body 1001 is defined as a positive direction. A Y-axis is an axis representing a vertical direction of the image capturing apparatus body 1001, and a direction from a bottom side toward a top side is defined as a positive direction. An X-axis is an axis representing a left-right direction of the image capturing apparatus body 1001, and a direction from a left side toward a right side, as viewed from the front, is defined as a positive direction. The directions of the respective axes, defined as above, are used in the following description, on an as-needed basis.

The grip unit 2080, the lens barrel 2100, the large-sized expansion unit 4500, and the panel unit 2500 each have means for connecting to the image capturing apparatus body 1001 and can be electrically connected thereto. The large-sized expansion unit 4500 supplies electrical power to the image capturing apparatus body 1001. The panel unit 2500 has display means for providing information required to check a video when shooting and various setting conditions of the image capturing system 1000, to the user.

The lens barrel 2100 causes light from an object to form an image on an image sensor 2010 (see FIG. 45) provided in the image capturing apparatus body 1001. The handle 2400 is gripped by the user when the user is moving and contributes to the user convenience. The grip unit 2080 is gripped by the user when the user performs shooting, and makes it possible for the user to stably hold the image capturing system 1000 and perform various operations on the image capturing system 1000.

The function expansion units removably attached to the image capturing apparatus body 1001 are by no means limited to the above-mentioned ones, but the use can select from a wide variety of function expansion units and attach the selected one(s) to the image capturing apparatus body 1001 as desired. Thus, the image capturing system 1000 can be configured to meet needs varying with shooting environments etc., and has high expandability.

Figure 45:
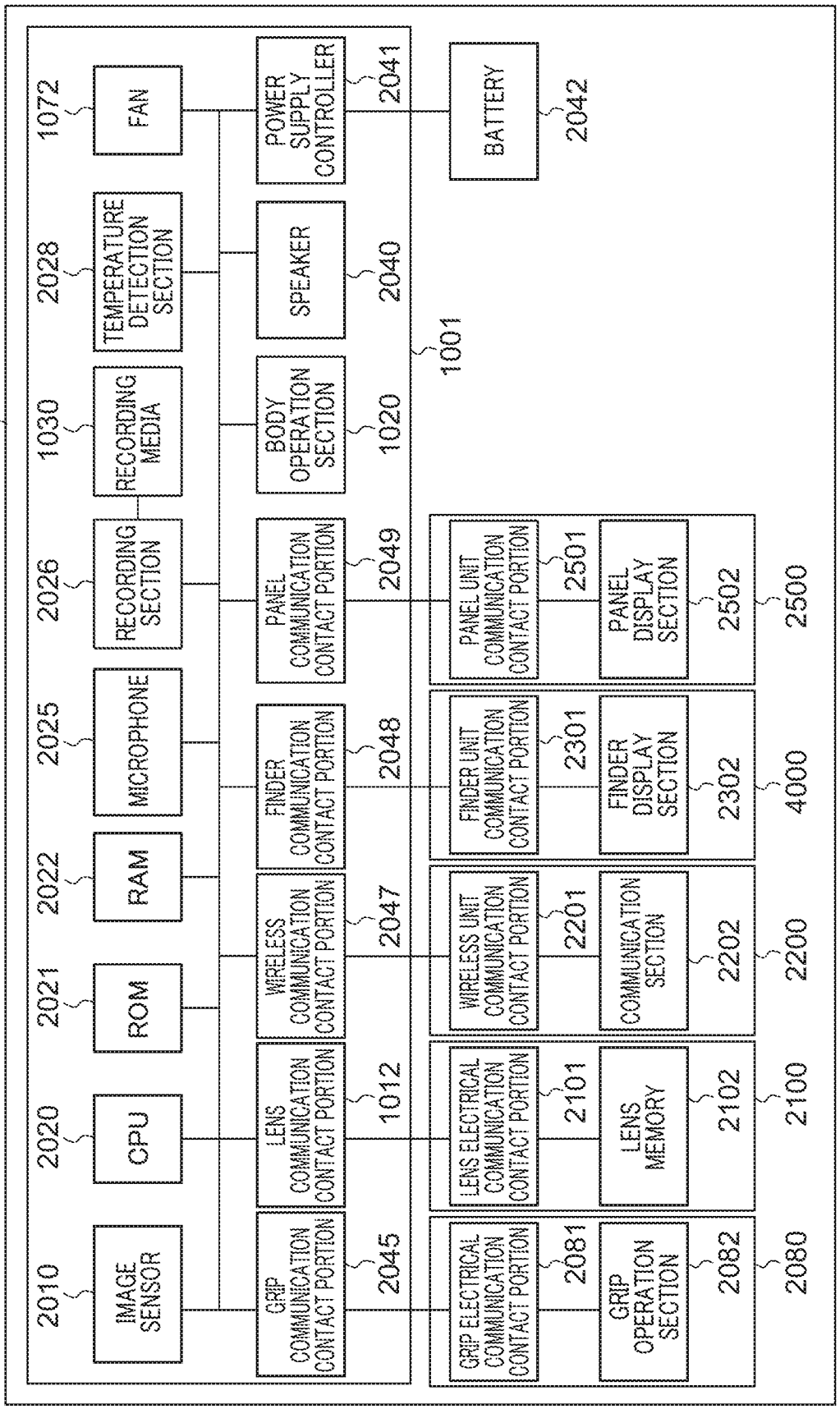
FIG. 45 is a schematic functional block diagram of the image capturing system.

FIG. 45 is a schematic block diagram of the image capturing system 1000. Now, the functional configuration of the image capturing system 1000 will be described with reference to FIG. 45

The image capturing apparatus body 1001 includes an image sensor 2010, a CPU 2020, a ROM 2021, a RAM 2022, a microphone 2025, a recording section 2026, a body operation section 1020, a speaker 2040, and a power supply controller 2041. Further, the image capturing apparatus body 1001 includes a grip communication contact portion 2045, a lens communication contact portion 1012, a wireless communication contact portion 2047, a viewfinder communication contact portion 2048, and a panel communication contact portion 2049.

The grip unit 2080 includes a grip electrical communication contact portion 2081 and a grip operation section 2082. The lens barrel 2100 includes a lens electrical communication contact portion 2101 and a lens memory 2102. The wireless unit 2200 includes a wireless unit communication contact portion 2201 and a communication section 2202. A viewfinder unit 4000 includes a viewfinder unit communication contact portion 2301 and a viewfinder display section 2302. The panel unit 2500 includes a panel unit communication contact portion 2501 and a panel display section 2502.

The image sensor 2010 is a CCD or a CMOS image sensor, and includes an analog-to-digital converter. The lens barrel 2100 causes incident light to form an optical image on the image sensor 2010, and the image sensor 2010 converts the optical image formed thereon to analog electrical signals, further converts the analog electrical signals to digital signals using the analog-to-digital converter, and outputs the digital signals as video data.

Figure 6:
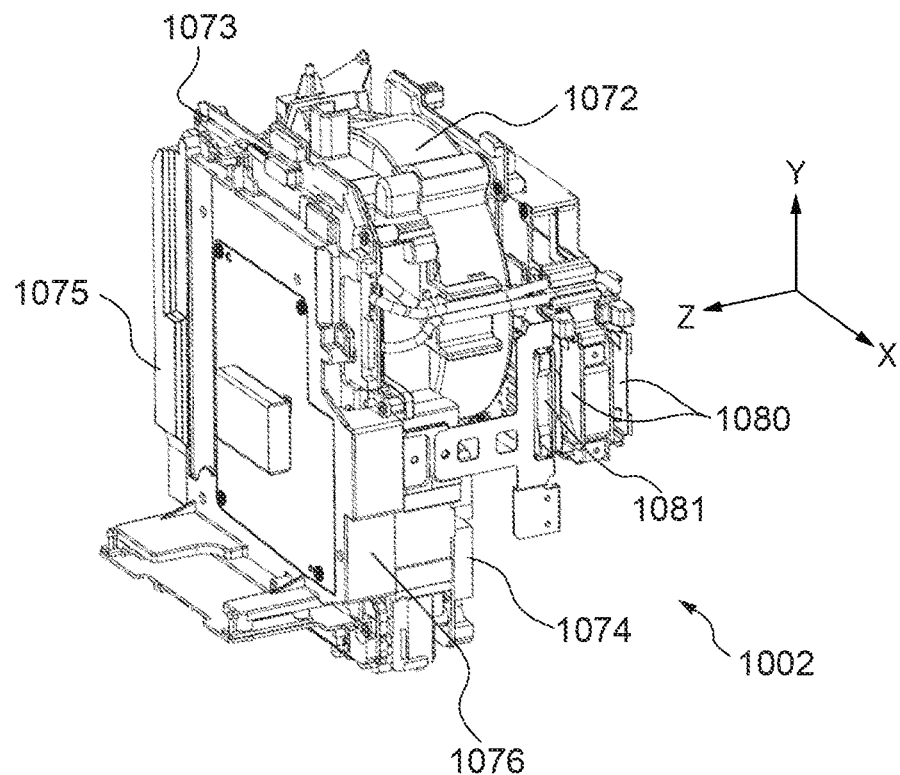
FIG. 6 is a perspective view of a main unit of the image capturing apparatus body as viewed from the front and leftward above.

The CPU 2020, the ROM 2021, and the RAM 2022 are mounted on a main circuit board 1073 (see FIG. 6). The ROM 2021 is an electrically erasable and recordable memory, and for example, an EEPROM is used. The ROM 2021 stores constants, programs, etc. for the operation of the CPU 2020. The CPU 2020 realizes the centralized control of the image capturing apparatus body 1001 by executing the programs stored in the ROM 2021 to thereby control the operations of the components of the image capturing apparatus body 1001.

The RAM 2022 is used as a system memory, a work memory, an image memory, an audio memory, etc., and the constants, variables, and the programs read from the ROM 2021, etc., for the operation of the CPU 2020 are loaded into the RAM 2022. Audio signals input from the microphone 2025 are subjected to gain control to a predetermined level and thereafter converted from analog to digital to form digital audio data. The video data and the audio data are temporarily stored in the RAM 2022.

The CPU 2020 transmits the video data and audio data temporarily stored in the RAM 2022 to the recording section 2026. Recording media 1030 can be inserted and removed in and from the recording section 2026, and the recording section 2026 records the video data and the audio data in the recording media 1030. As the recording media 1030, removal flash memories, such as SD cards, are used.

A temperature detection section 2028 is e.g. a thermistor, and is mounted on the main circuit board 1073. A fan 1072 is operated based on a temperature acquired by the temperature detection section 2028, and draws and discharges air into and from the inside of the image capturing apparatus body 1001. The rotational state of the fan 1072 is controlled by the CPU 2020. The body operation section 1020 transfers an instruction input by a user's operation to the CPU 2020. The body operation section 1020 includes a body REC button 1021, a power switch 1022, and a body operation button group 1023 (see FIG. 3). An operation sound generated when operating the body operation section 1020, a beep generated when starting or stopping storing of a video, etc., are output from the speaker 2040 under the control of the CPU 2020.

The power supply controller 2041 is comprised of a battery detection circuit, a DC-DC converter, and a switch circuit for switching blocks to be energized, etc., and detects whether or not a battery 2042 is attached, a battery type, and a battery remaining amount. The battery 2042 which supplies electrical power to the image capturing apparatus body 1001 is removable with respect to the image capturing apparatus body 1001, and is e.g. a lithium ion battery.

When the grip communication contact portion 2045 of the image capturing apparatus body 1001 and the grip electrical communication contact portion 2081 of the grip unit 2080 are brought into contact with each other to be electrically connected to each other, the CPU 2020 of the image capturing apparatus body 1001 detects attachment of the grip unit 2080. When the grip operation section 2082 of the grip unit 2080 is operated by a user, various instructions from the user are sent to the CPU 2020.

When the lens communication contact portion 1012 of the image capturing apparatus body 1001 and the lens electrical communication contact portion 2101 of the lens barrel 2100 are brought into contact with each other to be electrically connected to each other, the CPU 2020 of the image capturing apparatus body 1001 detects attachment of the lens barrel 2100. When attachment of the lens barrel 2100 is detected, the CPU 2020 reads lens information from the lens memory 2102 and stores the read lens information in the RAM 2022.

When the wireless communication contact portion 2047 of the image capturing apparatus body 1001 and the wireless unit communication contact portion 2201 of the wireless unit 2200 are brought into contact with each other to be electrically connected to each other, the CPU 2020 of the image capturing apparatus body 1001 detects attachment of the wireless unit 2200. When attachment of the wireless unit 2200 is detected, the CPU 2020 transmits video data and audio data stored in the RAM 2022 to the wireless unit 2200. The communication section 2202 of the wireless unit 2200 transmits the video data and audio data sent from the RAM 2022 to an external apparatus (not shown).

When the viewfinder communication contact portion 2048 of the image capturing apparatus body 1001 and the viewfinder unit communication contact portion 2301 of the viewfinder unit 4000 are brought into contact with each other to be electrically connected to each other, the CPU 2020 of the image capturing apparatus body 1001 detects attachment of the viewfinder unit 4000. When attachment of the viewfinder unit 4000 is detected, the CPU 2020 transmits video data stored in the RAM 2022 to the viewfinder unit 4000. The viewfinder display section 2302 of the viewfinder unit 4000 is e.g. a liquid crystal display device, and displays an operating status of the image capturing apparatus body 1001, etc., as on-screen display information, on an as-needed basis.

When the panel communication contact portion 2049 of the image capturing apparatus body 1001 and the panel unit communication contact portion 2501 of the panel unit 2500 are brought into contact with each other to be electrically connected to each other, the CPU 2020 of the image capturing apparatus body 1001 detects attachment of the panel unit 2500. When attachment of the panel unit 2500 is detected, the CPU 2020 transmits video data stored in the RAM 202 to the panel unit 2500. The panel display section 2502 of the panel unit 2500 is e.g. a liquid crystal display device, and displays an operating status of the image capturing apparatus body 1001, as on-screen display information, on an as-needed basis. Note that the information displayed on the panel display section 2502 and the viewfinder display section 2302 can be made identical or different, by configuration by the user.

In the image capturing system 1000, for example, light received by the image sensor 2010 is converted to digital image data of at least approximately 23 frames per second (fps), and the digital image data is recorded in one of the recording media 1030 by the recording section 2026. The frame rate can be set within a range from approximately 1 fps to not lower than approximately 250 fps. For example, the image capturing system 1000 may change the frame rate according to a set resolution. More specifically, a frame rate within a range from approximately 1 fps to approximately 100 fps is set in a "5K" resolution mode, and a frame rate within a range from approximately 1 fps to approximately 125 fps is set in a "4K" resolution mode. A frame rate within a range from approximately 1 fps to approximately 125 fps is set in a Quad HD mode, a frame rate within a range from approximately 1 fps to approximately 160 fps is set in a "3K" resolution mode, and a frame rate within a range from approximately 1 fps to approximately 250 fps is set in a "2K" resolution mode. For example, as the frame rate, 20, 23.976, 24, 30, 60 and 120 fps, or other frame rates between these frame rates, or frame rates not lower than these frame rates may be set.

The image capturing system 1000 can output image data at a resolution of "2K" (such as 16:9 (2048×1152 pixels) and 2:1 (2048×1024 pixels)), a resolution of "3K" (such as 16:9 (3072×1728 pixels) and 2:1 (3072×1536 pixels)), a resolution of "4K" (such as 4096×2540 pixels, 16:9 (4096×2304 pixels), and 2:1 (4096×2048 pixels)), a resolution of "4.5K", a resolution of Quad HD (such as 3840×2160 pixels), a resolution of "5K" (such as 5120×2700 pixels), a resolution of "6K" (such as 6144×3160 pixels), a resolution of "8K" (such as 7680×4320 pixels), or a resolution higher than 8K. The image capturing system 1000 can be configured to record or output image data having a horizontal resolution at least between any values of the above-mentioned resolutions.

Further, the resolution is at least one of the above-mentioned values (or some value between the above-mentioned values), and can take approximately 6.5K, 7K, 8K, 9K, or 10K, or some value between the above-mentioned values. In the present embodiment, in information expressed in the form of xK (such as the above-mentioned 2K and 4K), the number of "x" refers to an approximate horizontal resolution. Therefore, the resolution of "4K" corresponds to the number of horizontal pixels which is approximately not smaller than 4000, and the resolution of "2K" corresponds to the number of horizontal pixels which is approximately not smaller than 2000.

The image sensor 2010 can be adapted to a size from approximately 0.5 inch (8 mm) to ⅔ inch, S35 for a movie, 35 mm full-frame for a still camera, and up to 645 (medium size). Further, the image sensor 2010 can have sizes of approximately 10.1 mm×5.35 mm, 24.4 mm×13.7 mm, 30×15 mm, 36 mm×24 mm, 56×42 mm, and 186 mm×56 mm. Further, the image sensor 2010 can be configured to provide a variable resolution by selectively outputting only predetermined part of the pixel area. The image sensor 2010 can include e.g. color filters arranged in the Bayer array. Therefore, the image sensor 2010 outputs data indicating an amount of red light, green light, or blue light, detected by each photoelectric conversion element of the image sensor 2010.

Figure 3:
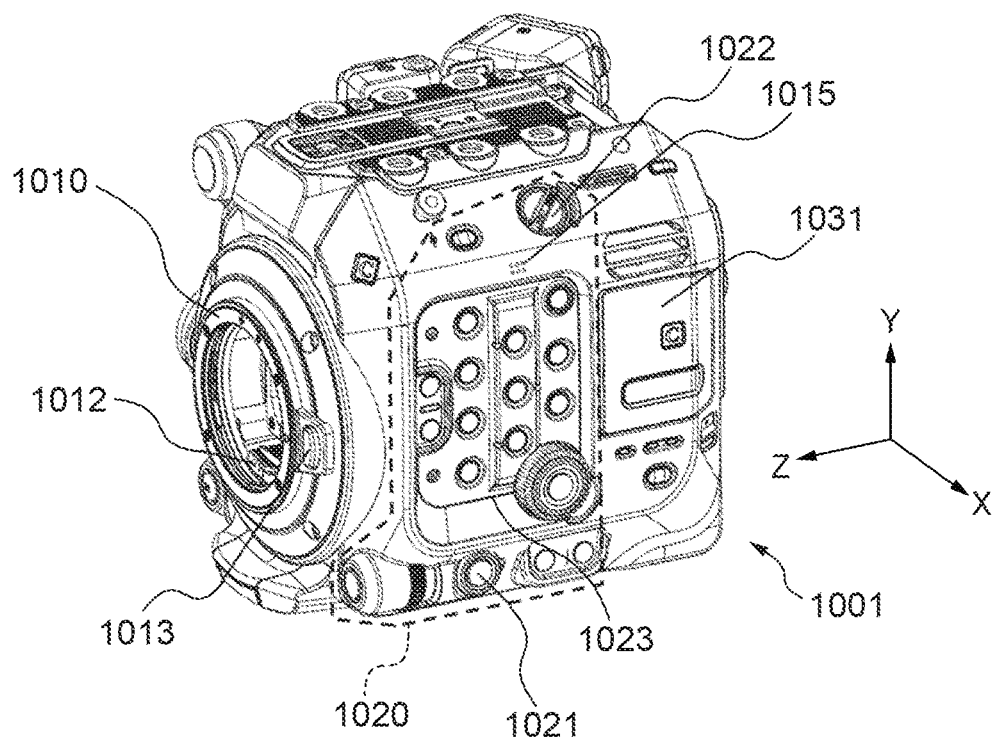
FIG. 3 is a perspective view of the image capturing apparatus body as viewed from the front and above.
Figure 4:
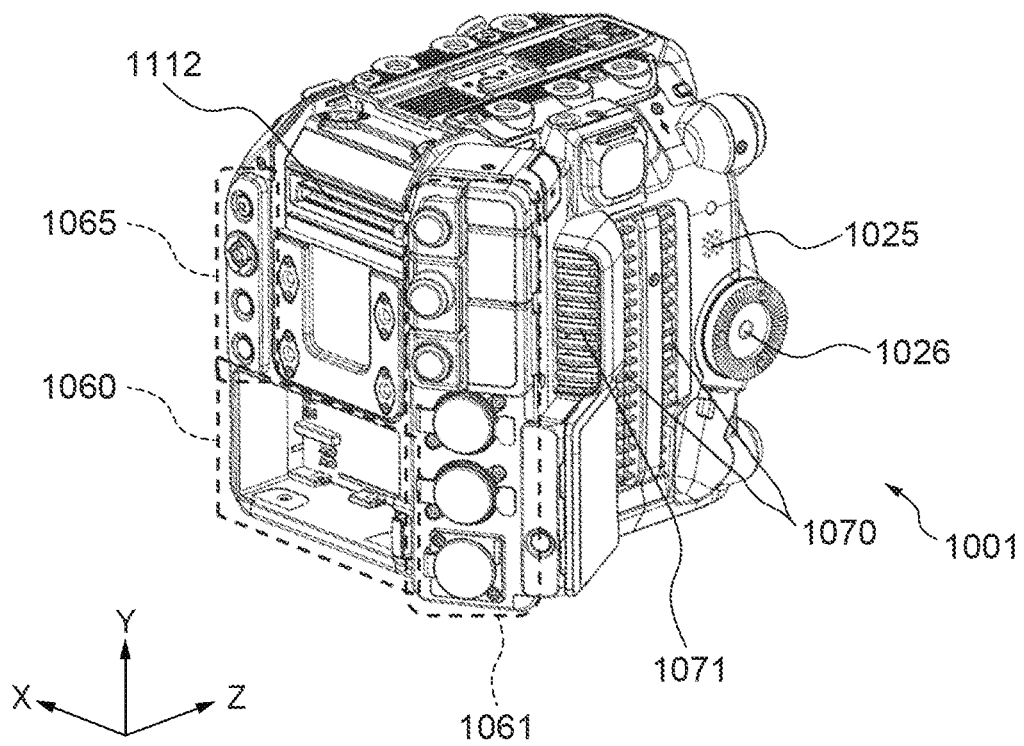
FIG. 4 is a perspective view of the image capturing apparatus body as viewed from the rear and above.

Next, the construction of the image capturing apparatus body 1001 will be described in detail. FIG. 3 is a perspective view of the image capturing apparatus body 1001 as viewed from the front and above. FIG. 4 is a perspective view of the image capturing apparatus body 1001 as viewed from the rear and above.

The front side of the image capturing apparatus body 1001 is provided with a lens mount 1010, the lens communication contact portion 1012, and a lens release button 1013. The lens barrel 2100 can be mounted on and removed from the lens mount 1010. When the lens barrel 2100 is mounted on the lens mount 1010, the lens communication contact portion 1012 is electrically connected to the lens electrical communication contact portion 2101 of the lens barrel 2100. This enables control of the operation of the lens barrel 2100 by the image capturing apparatus body 1001. The lens release button 1013 is operated when removing the lens barrel 2100 attached to the image capturing apparatus body 1001 therefrom.

Note that within the image capturing apparatus body 1001, at a location rearward of the lens mount 1010, there is disposed a sensor circuit board (not shown) that converts video signals output from the image sensor 2010 into predetermined data.

The right side of the image capturing apparatus body 1001 as viewed from the front is provided with the body operation section 1020 operated by the user so as to cause the image capturing apparatus body 1001 to execute predetermined operations, and microphone holes 1015 for the microphone 2025. The body operation section 1020 includes, as mentioned hereinabove, the body REC button 1021, the power switch 1022, and the body operation button group 1023. Further, the right side of the image capturing apparatus body 1001 as viewed from the front is provided with a recording media-accommodating cover 1031 that covers an accommodating chamber for accommodating the recording media 1030 (see FIG. 10) such that the recording media-accommodating cover 1031 can be closed and opened.

The rear side of the image capturing apparatus body 1001 is provided with a battery receiving section 1060, an input/output terminal group 1061, an expansion unit connection connector 1112 (hereafter referred to as "the expansion connector 112"), and a body rear-side operation section 1065. The battery receiving section 1060 receives the battery 2042 (see FIG. 24) therein. The input/output terminal group 1061 includes an external connection terminal, a power supply terminal, and so forth. The expansion connector 112 is used for electrically connecting the image capturing apparatus body 1001 to a function expansion unit. The body rear-side operation section 1065 is part of the body operation section 1020, and details thereof will be described hereinafter.

The left side of the image capturing apparatus body 1001 as viewed from the front is provided with an air inlet port 1070 and an air outlet portion 1071. By driving the fan 1072 (see FIG. 6), outside air is dawn via the air inlet port 1070 into the inside of the image capturing apparatus body 1001. The air drawn in is heated by receiving heat from heated components within the image capturing apparatus body 1001 as it flows through an air flow path within the image capturing apparatus body 1001 and is discharged as a heat discharging air stream from the air outlet port 1071.

Here, the image capturing system 1000 shown in FIG. 1 is configured assuming that a user performs image capturing by placing the image capturing system 1000 on the right shoulder of the user, and in this case, the face of the user is adjacent to the right side of the image capturing apparatus body 1001. In view of this, the air outlet port 1071 is provided in the left side of the image capturing apparatus body 1001 so as to prevent exhaust wind discharged from the image capturing apparatus body 1071 from blowing against the face of the user, whereby the image capturing system 1000 is configured so as not to make the user uncomfortable.

Further, the left side of the image capturing apparatus body 1001 as viewed from the front is provided with speaker holes 1025 for letting out sound from a speaker 2040, and a body-side attachment mechanism 1026 which enables a function expansion unit (accessory), such as the grip unit 2080, to be attached to the image capturing apparatus body 1001.

Figure 5:
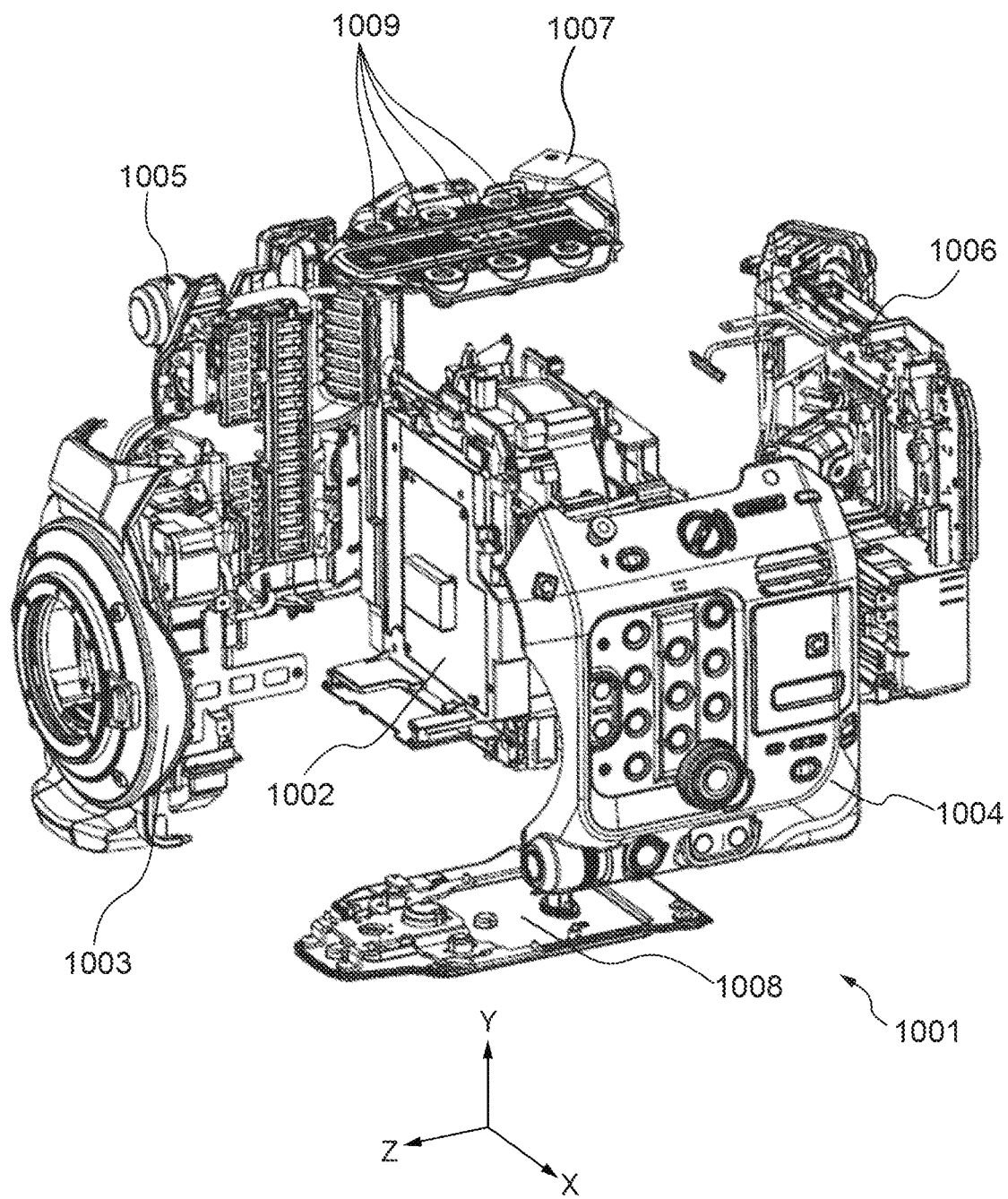
FIG. 5 is an exploded perspective view of the image capturing apparatus body.

FIG. 5 is an exploded perspective view of the image capturing apparatus body 1000, which is useful in describing the internal structure of the image capturing apparatus body 1001. The image capturing apparatus body 1001 includes a main unit 1002, exterior units arranged such that they enclose the main unit 1002, thereby forming the exterior. Specifically, the exterior units are a front cover unit 1003, a right cover unit 1004, a left cover unit 1005, a rear cover unit 1006, a top cover unit 1007, and a bottom cover unit 1008. The top cover unit 1007 has a plurality of screw holes 1009 formed therein, which enables an external device, an accessory, or the like to be attached to the image capturing apparatus body 1001. Note that the left and right of the image capturing apparatus body 1001 are defined in a state in which the image capturing apparatus body 1001 is viewed from the front toward the rear.

Figure 7:
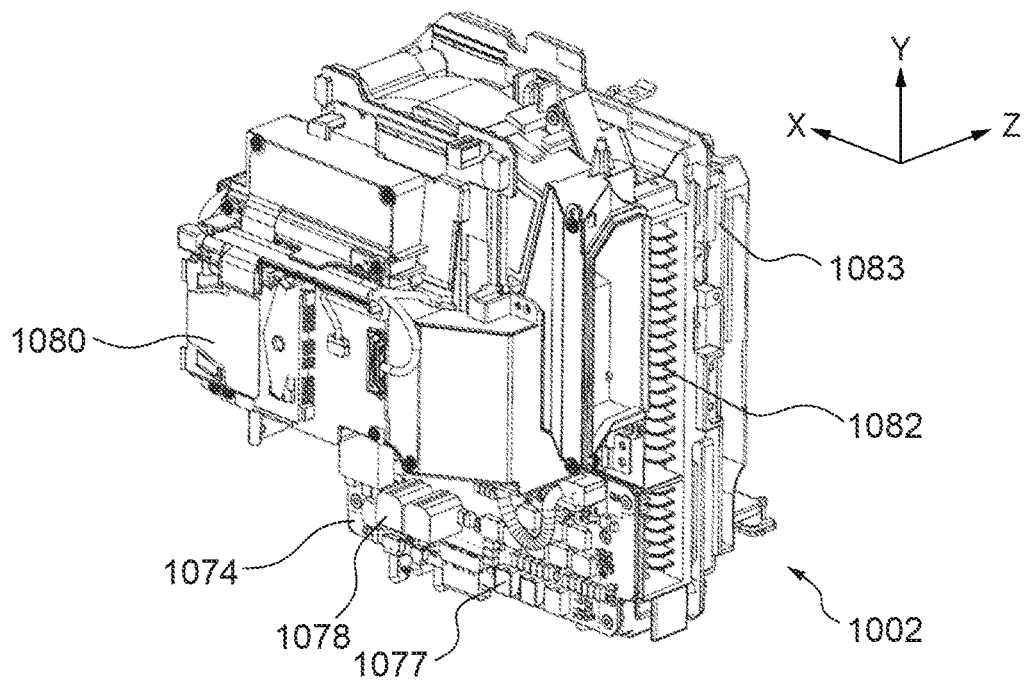
FIG. 7 is a perspective view of the main unit of the image capturing apparatus body as viewed from the rear and rightward above

FIG. 6 is a first perspective view of the main unit 1002, as viewed from the front and leftward above the image capturing apparatus body 1001. FIG. 7 is a second perspective view of the main unit 1002, as viewed from the rear and rightward above the image capturing apparatus body 1001.

The main unit 1002 includes the fan 1702, the main circuit board 1073, a power supply circuit board 1074, a sensor duct 1075, and a main circuit board-cooling duct 1076. The sensor duct 1075 is made of plate metal, such as copper or aluminum, which is excellent in thermal conductivity, and dissipates heat generated by components mounted on the main circuit board 1073 and the sensor circuit board (not shown).

The main circuit board 1073 is electrically connected to substantially all electronic components and electric components, and hence has a lot of IC's mounted thereon. The main circuit board 1073 has the largest area of all circuit boards within the image capturing apparatus body 1001. For example, an IC for processing signals from the sensor circuit board, a video processing IC for performing tone adjustment and the like on video signals, a memory used for each IC, and so forth are mounted on the main circuit board 1073. The power supply circuit board 1074 supplies power to the main circuit board 1073 as well as the electronic components and electric components within the image capturing apparatus body 1001. To total power consumption of the image capturing apparatus body 1001 is not small, and hence capacitors 1077 large in height, coils 1078, and the like, which are relatively large in size, are mounted on the power supply circuit board 1074.

As shown in FIG. 6, the image capturing apparatus body 1001 is provided with two card circuit boards 1080 for recording video data in recording media 1030, and one storage card circuit board 1081 for storing settings of the image capturing apparatus body 1001 at the time of shooting as data. To store high-resolution and/or high-frame rate videos, it is required to cool the recording media since ICs within the recording media generate large amounts of heat. To this end, the card circuit boards 1080 are configured such that heat dissipation rubbers (not shown) are provided therein and brought into contact with the recording media, thereby dissipating heat from the recording media 1030 via the card circuit boards 1080.

The main circuit board-cooling duct 1076 and the sensor duct 1075 are connected to a main air inlet section 1082 and a sensor air inlet section 1083 appearing in FIG. 7, respectively. The main air inlet section 1082 and the sensor air inlet section 1083 are connected to the air inlet port 1070, and the main circuit board-cooling duct 1076 is connected to the air outlet port 1071. Air is drawn in from the air inlet port 1070 and is heated by heat exchange within the image capturing apparatus body 1001, and the heated air is discharged from the air outlet port 1071, whereby temperature rise of the inside of the image capturing apparatus 1001 is suppressed.

Figure 8:
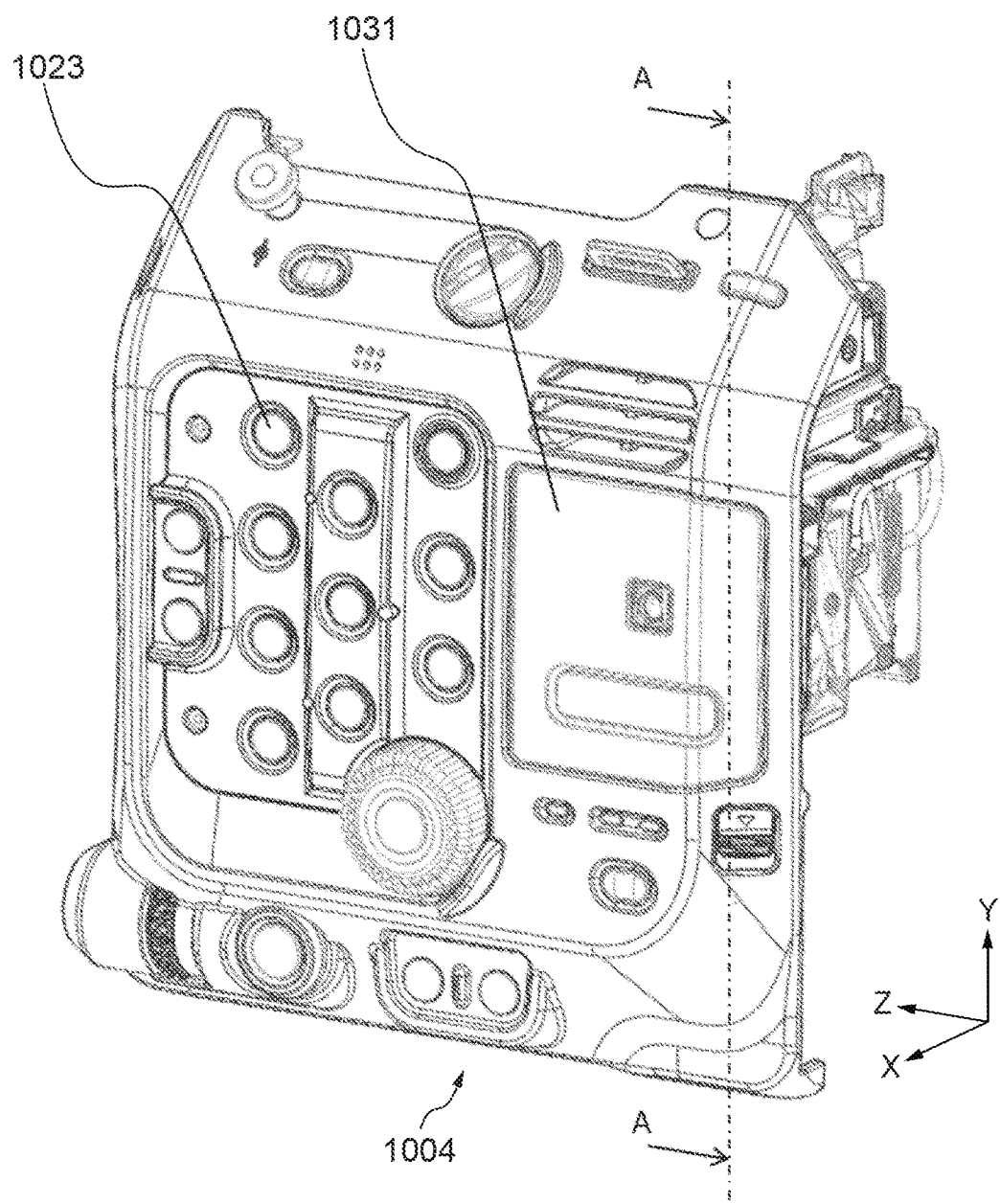
FIG. 8 is a perspective view of a right cover unit of the image capturing apparatus body in a state in which a recording media-accommodating cover is closed.

Next, the configuration of the right cover unit 1004 will be described mainly focusing on a peripheral structure of the recording media-accommodating cover 1031. FIG. 8 is a perspective view of the right cover unit 1004 in a state in which the recording media-accommodating cover 1031 is closed. The right cover unit 1004 is configured such that the recording media 1030 can be inserted and removed in the left-right direction (X-axis direction) with respect to the image capturing apparatus body 1001 so as to enable the user to easily insert and remove them when the recording media-accommodating cover 1031 is open.

As described above, the recording media-accommodating cover 1031 is provided in the right cover unit 1004 and the body operation button group 1023 is also provided in the right cover unit 1004. The user can perform image capturing by operating the body operation button group 1023, and further insert and remove the recording media 1030 used for storing video data, by opening the recording media-accommodating cover 1031. The image capturing apparatus body 1001 has the body operation button group 1023 and the recording media-accommodating cover 1031 on the same right cover unit 1004, thereby enabling operation of these to be performed on the same side of the image capturing apparatus body 1001, which increases the user friendliness.

Figure 9:
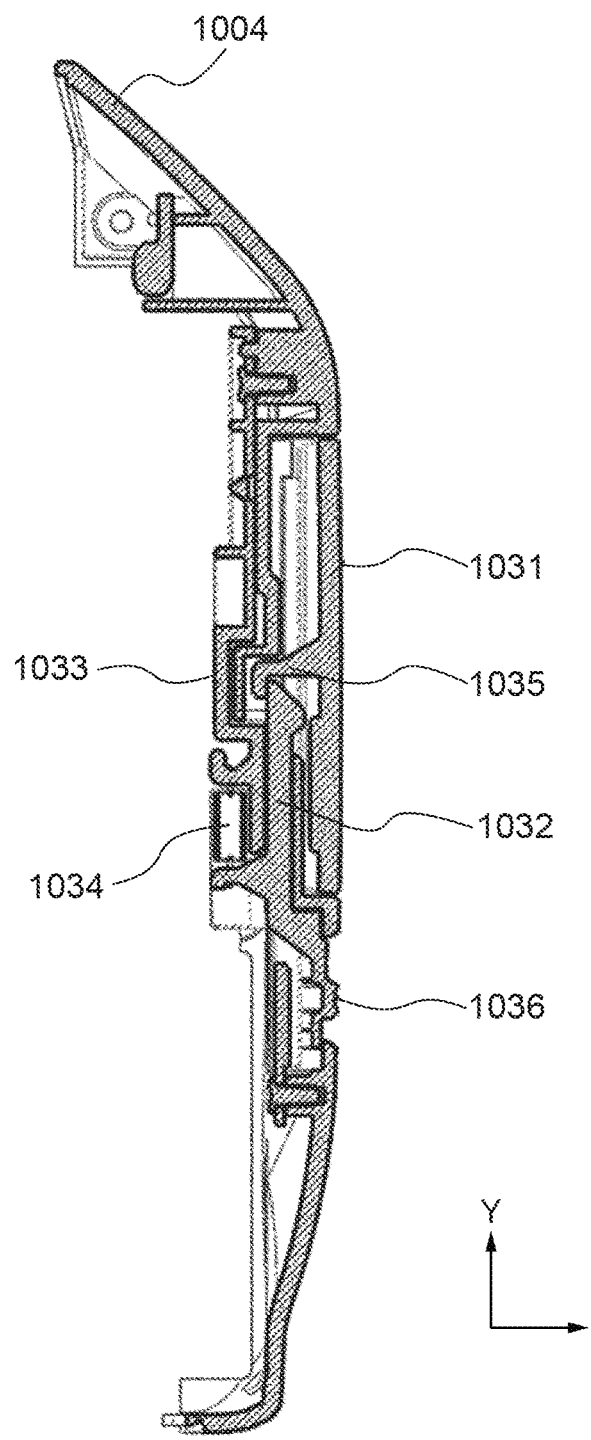
FIG. 9 is a cross-sectional view taken along line A-A in FIG. 8.

FIG. 9 is a cross-sectional view taken along line A-A in FIG. 8. In the vicinity of the recording media-accommodating cover 1031 provided in the right cover unit 1004, a cover opening/closing lever 1032, a cover holding member 1033, and a lever urging spring 1034 are provided. The recording media-accommodating cover 1031 has a locking portion 1035, and the locking portion 1035 is engaged with the cover opening/closing lever 1032, whereby the recording media-accommodating cover 1031 is held in a closed state. When the recording media-accommodating cover 1031 is in the closed state, the cover opening/closing lever 1032 is urged upward (in a positive Y-axis direction) by the urging force of the lever urging spring 1034 connecting between the cover opening/closing lever 1032 and the cover holding member 1033. By sliding a lever operating portion 1036 of the cover opening/closing lever 1032 downward (in a negative Y-axis direction), the cover opening/closing lever 1032 is disengaged from the recording media-accommodating cover 1031, which enables the recording media-accommodating cover 1031 to be opened.

Figure 10:
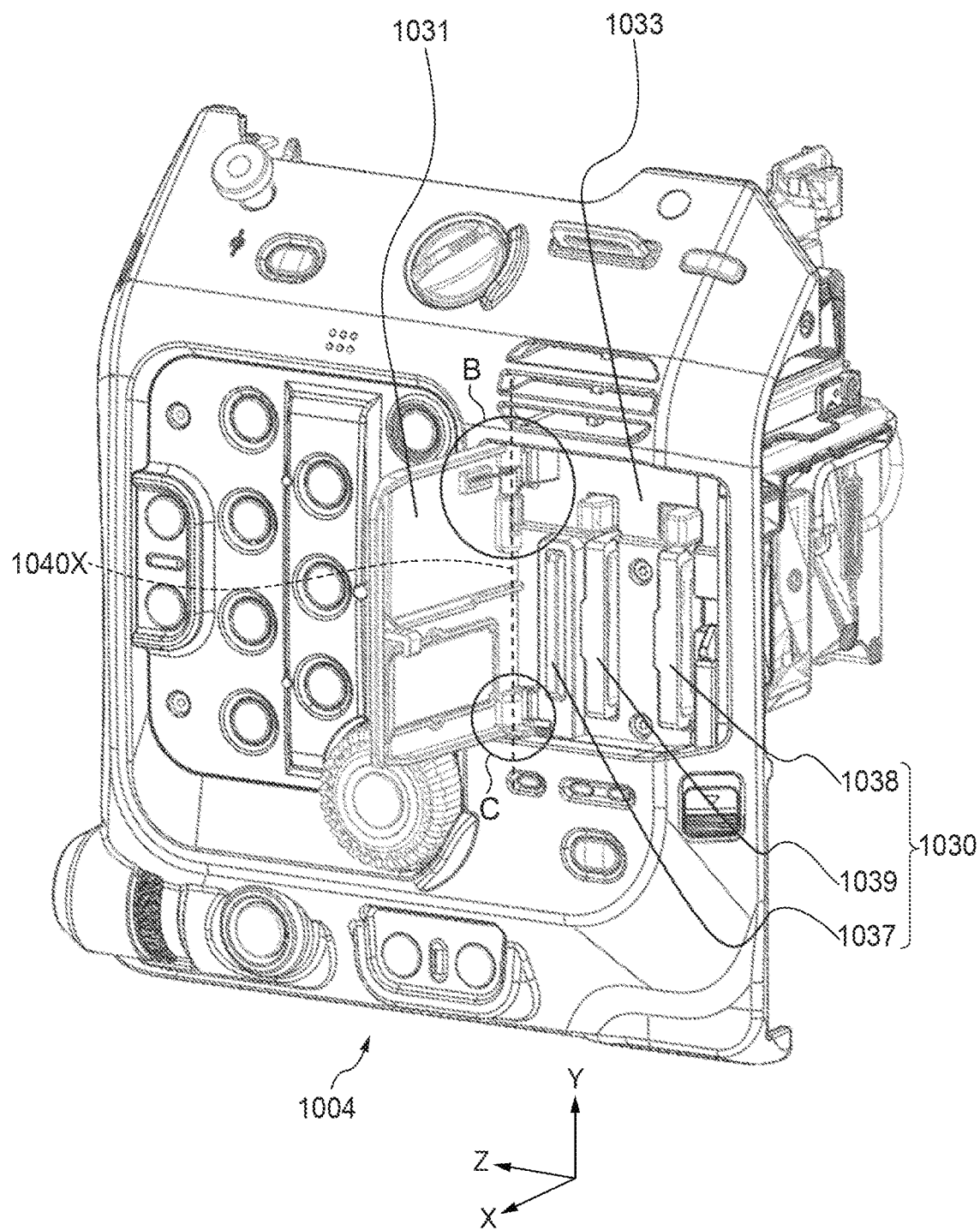
FIG. 10 is a perspective view of the right cover unit of the image capturing apparatus body in a state in which the recording media-accommodating cover is open.

FIG. 10 is an exploded perspective view of the right cover unit 1004 in a state in which the recording media-accommodating cover 1031 is open. The recording media-accommodating cover 1031 is capable of rotating about a rotational axis 1040X (axis of a rotational shaft 1140 appearing in FIG. 11) indicated by a broken line parallel to the Y axis. The recording media 1030 can be inserted and removed in the left-right direction (X-axis direction) of the image capturing apparatus body 1001.

In the present embodiment, as the recording media 1030, the three recording medium cards of main recording medium cards 1038 and 1039 and an auxiliary recording medium card 1037 can be accommodated in the image capturing apparatus body 1001 in a state in which respective main surfaces of the three medium cards are substantially parallel to each other. However, the number of recording medium cards is not limited to three, but it is only required that a plurality of recording medium cards can be accommodated.

The main recording medium cards 1038 and 1039 are used for main recording and the auxiliary recording medium 1037 is used for proxy recording. The auxiliary recording medium 1037 is shorter in a vertical direction (parallel to the rotational axis 1040X (the Y-axis direction)) than the main recording medium cards 1038 and 1039 and is disposed at a location close to the rotational shaft 1040. The rotational axis 1040X is orthogonal to a direction in which the auxiliary recording medium 1037 is inserted into or removed from the image capturing apparatus body 1001.

Figure 11:
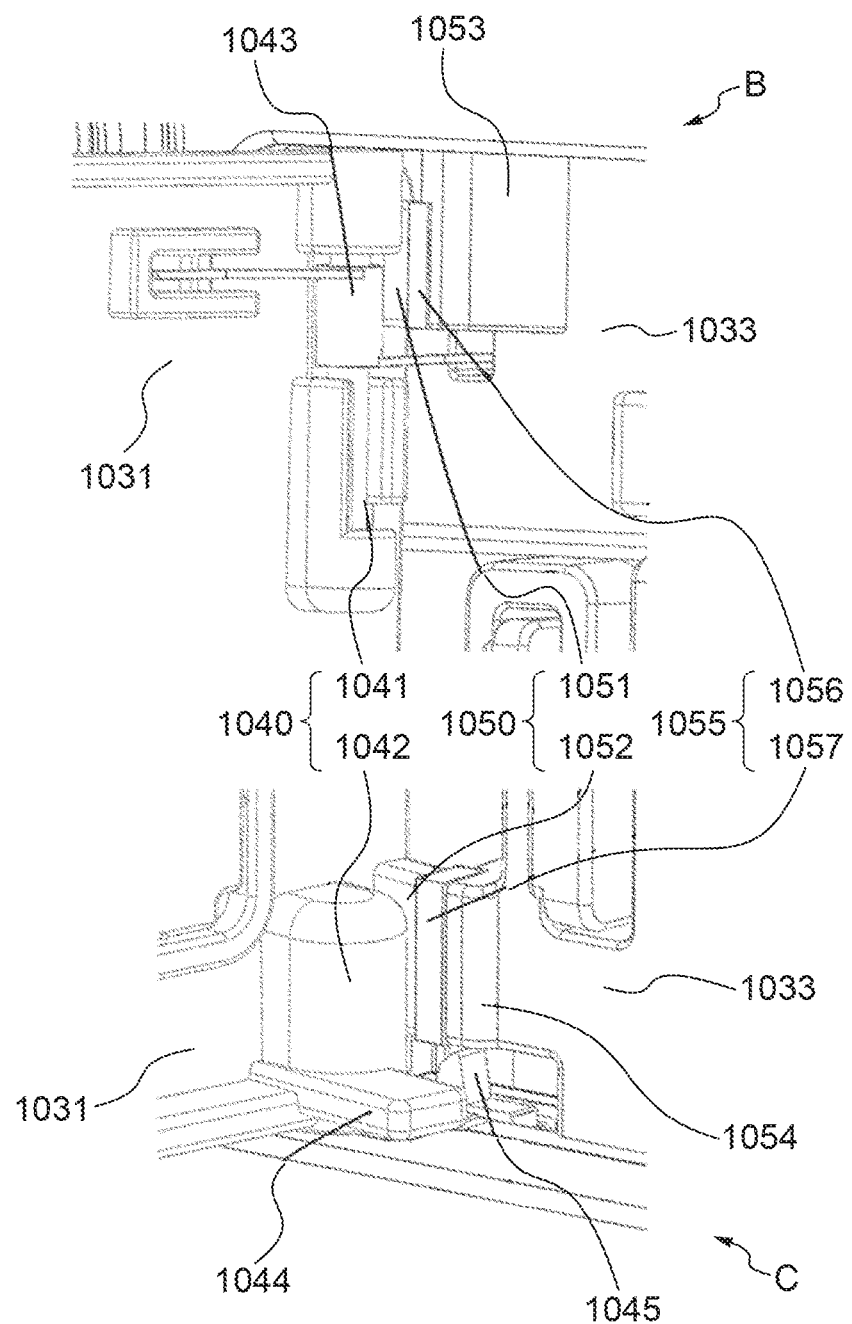
FIG. 11 is an expanded view of areas B and C appearing in FIG. 11.

FIG. 11 is an enlarged view of areas B and C appearing in FIG. 10. The recording media-accommodating cover 1031 is rotatable about the rotational axis 1040X. The rotational shaft 1040 is formed by an upper rotational shaft 1041 and a lower rotational shaft 1042. A cover opening/closing spring 1043 formed by a torsion spring is disposed such that one end thereof is in contact with the cover holding member 1033 and the other end thereof is in contact with the recording media-accommodating cover 1031, whereby the cover opening/closing spring 1043 urges the recording media-accommodating cover 1031 in a direction of opening about the rotational axis 1041X. When the cover opening/closing lever 1032 is disengaged from the recording media-accommodating cover 1031 by operating the lever operating portion 1036, the recording media-accommodating cover 1031 is opened by the urging force of the cover opening/closing spring 1043.

In the vicinity of the lower rotational shaft 1042, there is provided an opening/closing detection rib 1044. According to whether the recording media-accommodating cover 1031 is opened or closed, an opening/closing detection switch 1045 is switched between on and off. For example, when the recording media-accommodating cover 1031 in an open state is closed, the opening/closing detection rib 1044 is brought into contact with the opening/closing detection switch 1045, whereby the closing operation of the recording media-accommodating cover 1031 is detected. Note that the opening/closing detection rib 1044, the opening/closing detection switch 1045, and the cover opening/closing spring 1043 may be provided for a desired one of the upper rotational shaft 1041 and the lower rotational shaft 1042.

When the recording media-accommodating cover 1031 in a closed state is opened, static pressure receivers provided between static pressure ribs 1050 and the cover holding member 1033 are brought into contact with each other via cushioning members 1055, respectively. This makes it possible to avoid breakage of the recording media-accommodating cover 1031 even when an inadvertent force is applied to the recording media-accommodating cover 1031 when it is opened. The static pressure ribs 1050 are an upper static pressure rib 1051 and a lower static pressure rib 1052. Similarly, the static pressure receivers are an upper static pressure receiver 1053 and a lower static pressure receiver 1054 arranged at respective locations vertically spaced from each other, and the cushioning members 1055 are an upper cushioning member 1056 and a lower cushioning member 1057 arranged at respective locations vertically spaced from each other. Note that the upper static pressure rib 1051 and the lower static pressure rib 1052 are provide on a depth side (side behind the drawing sheet) of the upper rotational shaft 1041 and the lower rotational shaft 1042, and hence they do not appear inconspicuous when the recording media-accommodating cover 1031 is in the open state, so that high-grade appearance is ensured.

In the present embodiment, none of the cover opening/closing spring 1043, the opening/closing detection rib 1044, the opening/closing detection switch 1045, and the static pressure ribs 1050 are disposed at respective locations away from an area onto which the auxiliary recording medium card 1037, which is inserted or removed at a closest location to the rotational axis X of the medium cards, has its shadow projected in a direction perpendicular thereto. The direction perpendicular to the auxiliary recording medium card 1037 is a direction perpendicular to the main surface of the auxiliary recording medium card 1037, in other words, a Z-axis direction. This makes it possible to secure a space enabling a user's hand to access the auxiliary recording medium card 1037 being inserted or remove by the user, so that the user can easily insert or remove the auxiliary recording medium card 1037. That is, the insertion/removal operability of the auxiliary recording medium card 1037 is enhanced.

In the present embodiment, it is possible to reduce the distance between the rotational axis 1040X and the auxiliary recording medium card 1037 in a direction perpendicular to the recording media 1030. This makes it possible to make the recording media-accommodating cover 1031 compact in size, which in turn makes it possible to reduce the size of the image capturing apparatus body 1001.

Note that the invention concerning the peripheral structure of a recording media-accommodating cover of an image capturing apparatus is disclosed in Japanese Laid-Open Patent Publication (Kokai) No. 2015-34914 and the like. In the conventional structure, it is not easy to reduce the distance between a recording medium card and the rotational axis in a perpendicular direction of the recording medium card so as to secure a space for enabling the user to pinch the card when inserting or removing the same. In contrast, as described above, the present embodiment gives a solution to this problem, and as a result, it is possible to shorten (downsize) the image capturing apparatus body 1001 in the front-rear direction.

Figure 12:
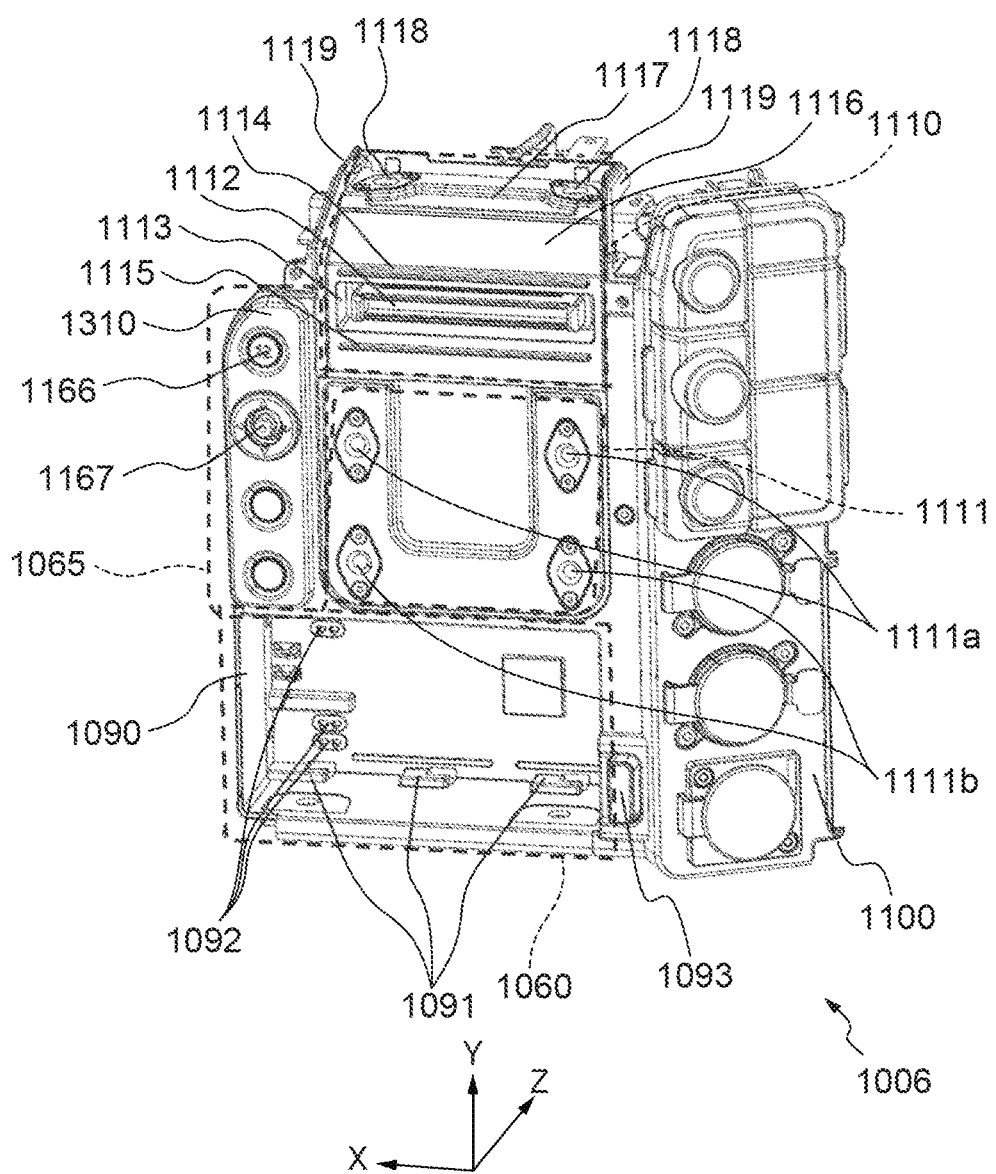
FIG. 12 is a first perspective view of a rear cover unit as a component of the image capturing apparatus body.

Next, the rear cover unit 1006 will be described. FIG. 12 is a perspective view of the rear cover unit 1006. The rear cover unit 1006 is largely divided into a body rear cover 1100 and a battery chamber cover 1090.

The battery chamber cover 1090 has the battery receiving section 1060 formed therein for receiving the battery 2042 (see FIG. 24) and includes battery fitting portions 1091 for mechanically fitting the battery 2042 in. The battery receiving section 1060 is formed with a polarity of openings, and battery contact portions 1092 are formed to protrude therefrom so as to achieve electrical connection to the battery 2042. Further, a battery eject knob 1093 which is operated when removing the battery 2042 from the battery receiving section 1060 is disposed on a side opposite to the battery contact portions 1092 in the X-axis direction. By supplying power from the battery 2042 to the image capturing apparatus body 1001, it is possible to operate the image capturing apparatus body 1001.

The body rear cover 1100 includes the body rear-side operation section 1065, a body expansion unit mounting recess 1110 (hereinafter referred to as "mounting recess 1110"), an expansion unit rear-side mounting portions 1111 (hereinafter referred to as "the rear-side mounting portions 1111"), and the input/output terminal group 1061. The rear-side mounting portions 1111 are two upper rear-side mounting portions 1111*a* and two lower rear-side mounting portions 1111*b*. The input/output terminal group 1061 includes external connection terminals, power terminals, and so forth.

The mounting recess 1110 has an opening 1113 formed in a substantially central portion thereof. The expansion connector 1112 is disposed inside the opening 1113 with its left-right direction (X-axis direction) as a longitudinal direction. An upper rib 1114 is provided on an upper side (positive Y-axis direction side) of the opening 1113, while a lower rib 1115 is provided on a lower side (negative Y-axis direction side) of the same. The upper rib 1114 and the lower rib 1115 each have a shape higher in the negative Z-axis direction than the most protruded portion of the expansion connector 1112. Further, on an upper side (positive Y-axis direction side) of the upper rib 1114, there is formed an inclined surface portion 1116, and a mounting-recess upper surface 1117 continuous from the inclined surface portion 1116 is provided with two upper fixing portions 1118. On left-right sides (opposite X-axis direction sides) of the mounting recess 1110, there are provided walls 1119 which enclose lateral sides of a connection portion of an expansion unit (not shown) when the expansion unit is mounted in the upper fixing portion 1118.

The body rear-side operation section 1065 is formed as a menu-related operation section including a menu button 1066, a cross key 1067, and so forth. By operating the menu button 10066, a menu mode for configuring various settings of the image capturing apparatus body 1001 is started, which enables access to the menu mode. The cross key 1067 enables selection of an item by vertical and lateral shifting operations and determination of the selected item by depression of a center thereof.

The body rear-side operation section 1065 is arranged on the rear cover unit 1006 toward the right cover unit 1004 than the rear-side mounting portions 1111. As described hereinabove, the body operation section 1020 and the body REC button 1021 are arranged on the right cover unit 1004. Thus, in the image capturing apparatus body 1001, operation sections are concentratedly arranged on one side, so that the operability of the image capturing apparatus body 1001 is enhanced.

Further, many of users perform menu operations of the image capturing system 1000 while viewing the panel unit 2500. In doing this, as shown in FIG. 1, the panel unit 2500 faces toward the rear side of the image capturing system 1000. Therefore, when performing menu operations while viewing the panel unit 2500, vertical and lateral directions (X-axis and Y-axis directions) of the cross key 1067 of the body rear-side operation section 1065 and the vertical and lateral directions of the panel unit 2500 correspond to each other, so that the user can intuitively perform the menu operations.

Figure 13:
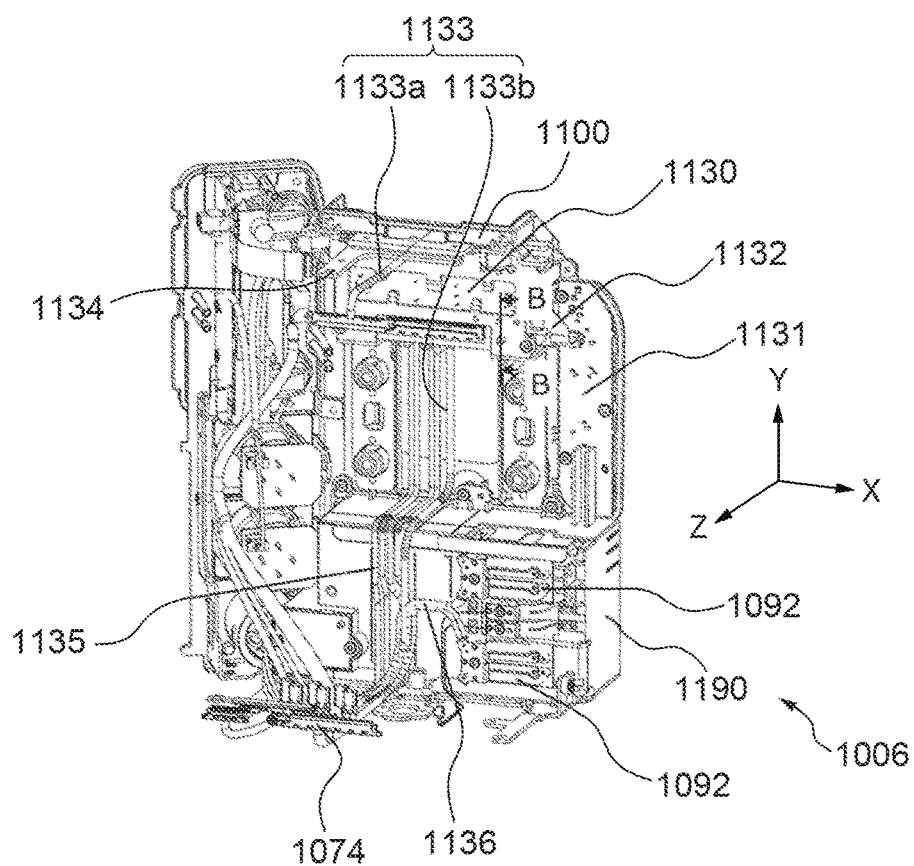
FIG. 13 is a second perspective view of the rear cover unit.

FIG. 13 is a perspective view of the rear cover unit 1006 as viewed from the reverse side thereof (inner side thereof when mounted on the image capturing apparatus body 1001). The body rear cover 1100 has a body communication circuit board 1130, a body operation section circuit board 1131, and a retainer metal panel 1134 fixed thereto. The expansion connector 1112 is mounted on the body communication circuit board 1130. The retainer metal panel 1134 plays the role of fixing circuit boards of the input/output terminal group 1061 (see FIG. 4) and the body communication circuit board 1130.

The body communication circuit board 1130 and the body operation section circuit board 1131 are electrically connected by an FFC 1132 (see FIG. 14), and the body communication circuit board 1130 is connected to the main circuit board 1073 (see FIG. 6) by inter-board connection wires 1133. The inter-board connection wires 1133 are specifically upper connection wires 1133*a* and lower connection wires 1133*b*.

The body communication circuit board 1130 and the power circuit board 1074 are connected by inter-board connection power lines 1135, and the battery contact portions 1092 and the power circuit board 1074 are connected by a battery power line 1136. Further, a large number of signal connection lines extend from circuit boards of the input/output terminal group 1061 and connected to the main circuit board 1073. The expansion connector 1112 transmits not only power but also synchronization signals, remote operation signals (control signals), video signals, and so forth.

Figure 14:
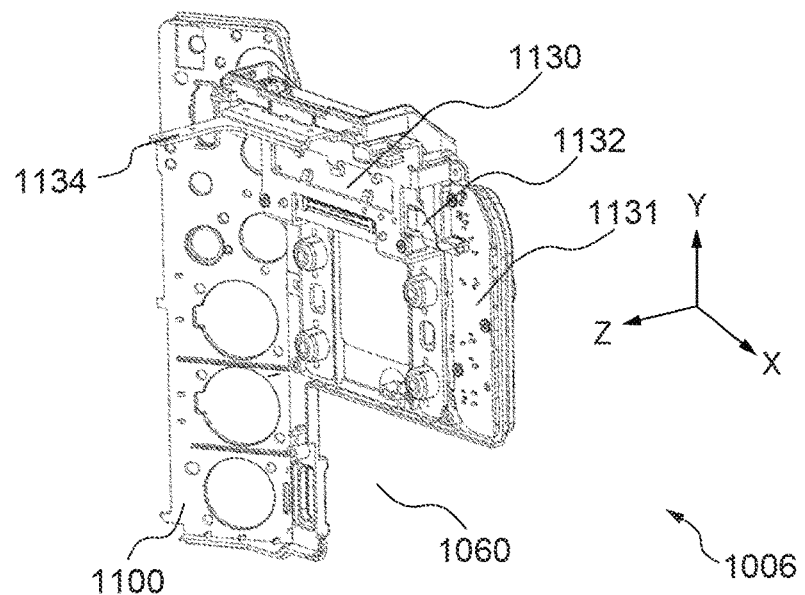
FIG. 14 is a perspective view of the rear cover unit in a state simplified from FIG. 13.
Figure 15:
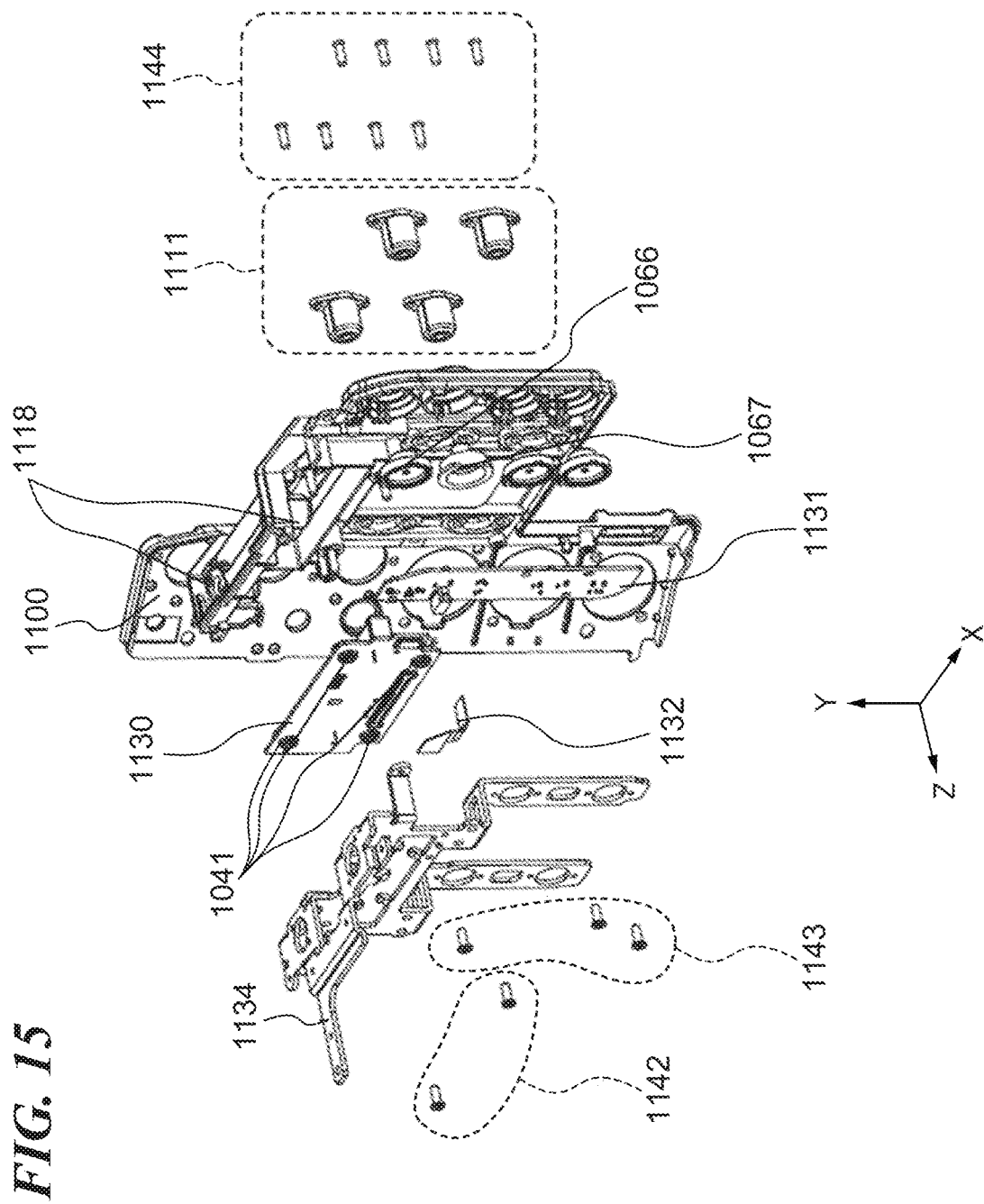
FIG. 15 is an exploded perspective view of the rear cover unit in the state shown in FIG. 14.

FIG. 14 is a perspective view of the rear cover unit 1006 in a simplified state, as viewed from the reverse side thereof similarly to FIG. 13, only illustrating the body communication circuit board 1130, the body operation section circuit board 1131, the retainer metal panel 1134, the rear-side mounting portions 1111, the body rear-side cover 1100, and its environments. FIG. 15 is an exploded perspective view of FIG. 14

The retainer metal panel 1134 is fixed to the body rear-side cover 1100 by plate panel screws 1142. Dampers 1141 attached to the body communication circuit board 1130 are sandwiched between the retainer metal panel 1134 and the body rear-side cover 1100. The body rear-side cover 1100 and the body operation section circuit board 1131 are fixed to each other by board fixing screws 1143 in a state holding components of the menu button 1066 and the cross key 1067 therebetween. The rear-side mounting portions 1111 are fixed to the retainer metal panel 1134 by mounting portion-fixing screws 1144 from outside the body rear-side cover 1100. The upper fixing portions 1118 are fixed to the retainer metal panel 1134 by screws, not shown. The retainer metal plate 1134 is a thick metal plate and hence the rear-side mounting portions 111 and the upper fixing portions 1118 can be firmly fixed to the retainer metal plate 1134.

Figure 16:
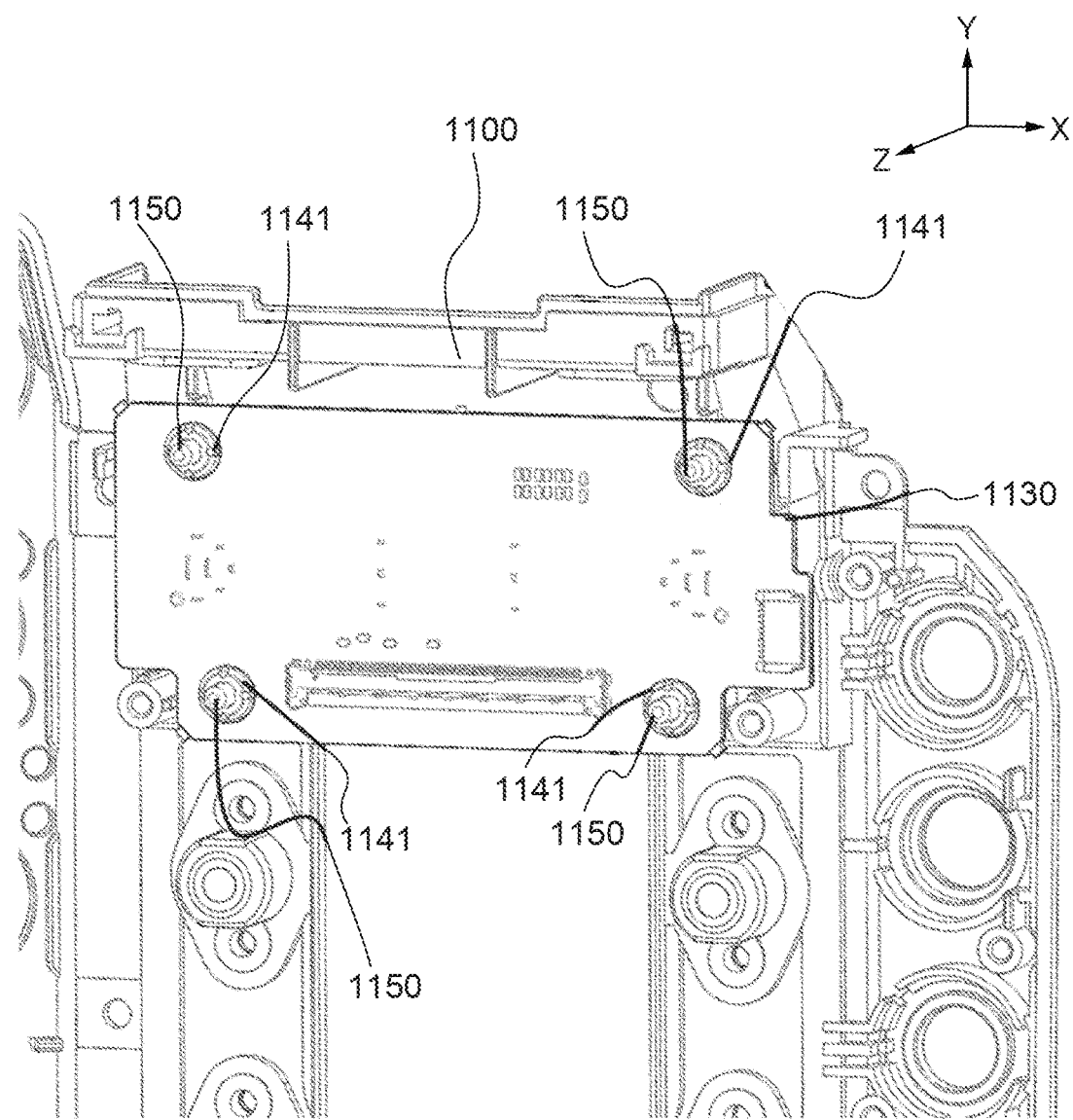
FIG. 16 is a perspective view of an apparatus body communication circuit board fixed to the rear cover unit.

Next, a floating structure of the body communication circuit board 1130 will be described. FIG. 16 is a perspective view of the body communication circuit board 1130 as viewed from the front side of the image capturing apparatus body 1001, showing a state in which the body communication circuit board 1130 is fixed to the body rear-side cover 1100 via the dampers 1141. Each damper 1141 is an example of an elastic member and a rubber (elastomer) is used therefor in the present embodiment. The dampers 1140 are fitted on four shafts 1150 provided on the body rear-side cover 1100, respectively, and the body communication circuit board 1130 is positioned by the dampers 1141.

Figure 17A:
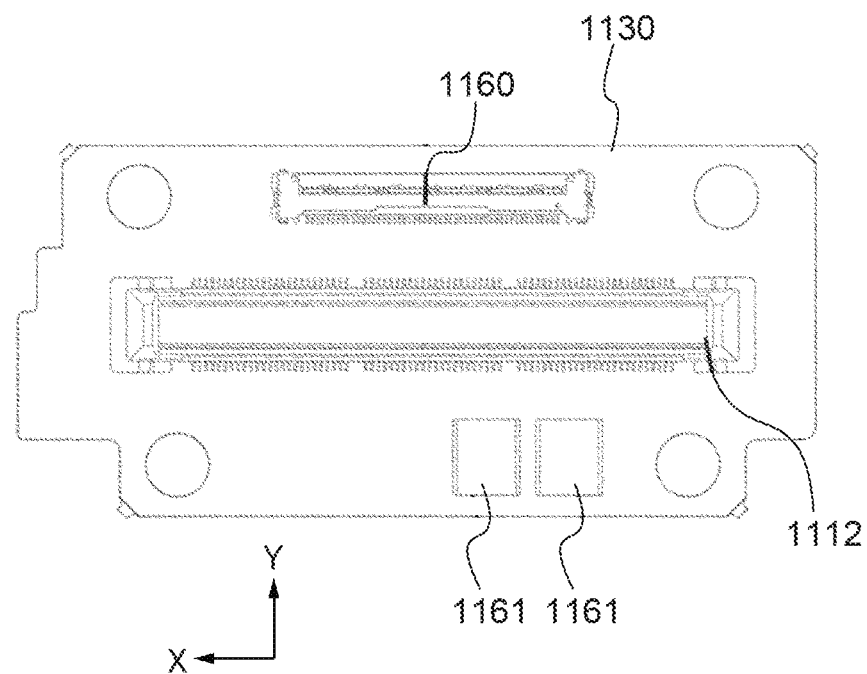
FIG. 17A is a front view of the apparatus body communication circuit board.

FIG. 17A is a rear view of the body communication circuit board 1130 (as viewed from the rear side of the image capturing apparatus body 1001). The expansion connector 1112 is mounted in a rear-side central portion of the body communication circuit board 1130. Further, on the body communication circuit board 1130, there are mounted an upper connector 1160 for connection to the upper connection wires 1133*a* and power connectors 1161 for connection to the inter-board connector power lines 1135.

Figure 17B:
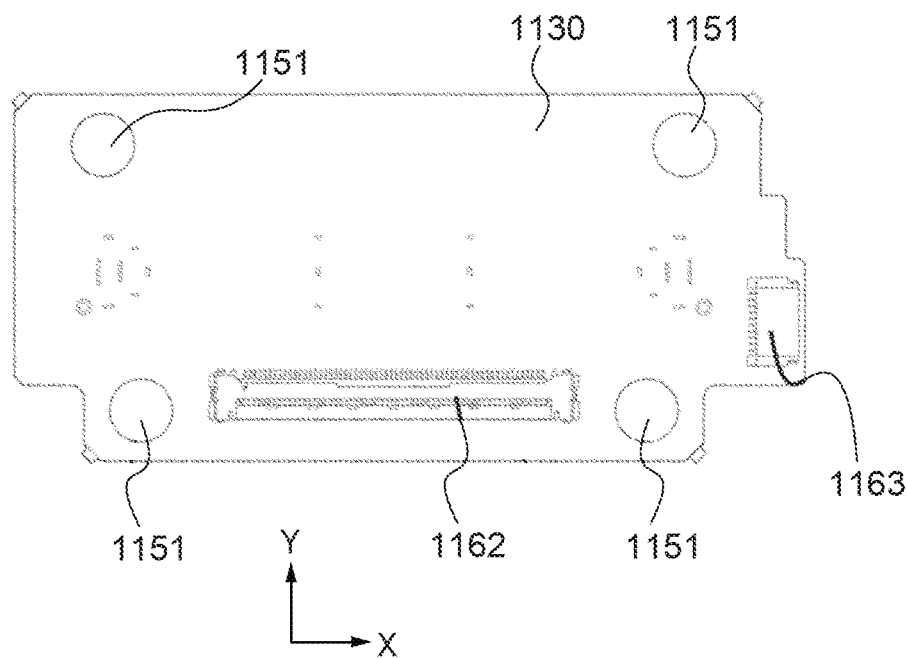
FIG. 17B is a rear view of the apparatus body communication circuit board.

FIG. 17B is a front view of the body communication circuit board 1130 (as viewed from the front side of the image capturing apparatus body 1101). On the front side of the body communication circuit board 1130, there are mounted a lower connector 1162 for having the lower connection wires 1133*b* connected thereto, and an FFC connector 1163 for having the FFC 1132 connected thereto. The communication circuit board 1130 has four holes 1151 formed therein and the dampers 1141 are inserted into the holes 1151, respectively, whereby the body communication circuit board 1130 is positioned.

Figure 18A:
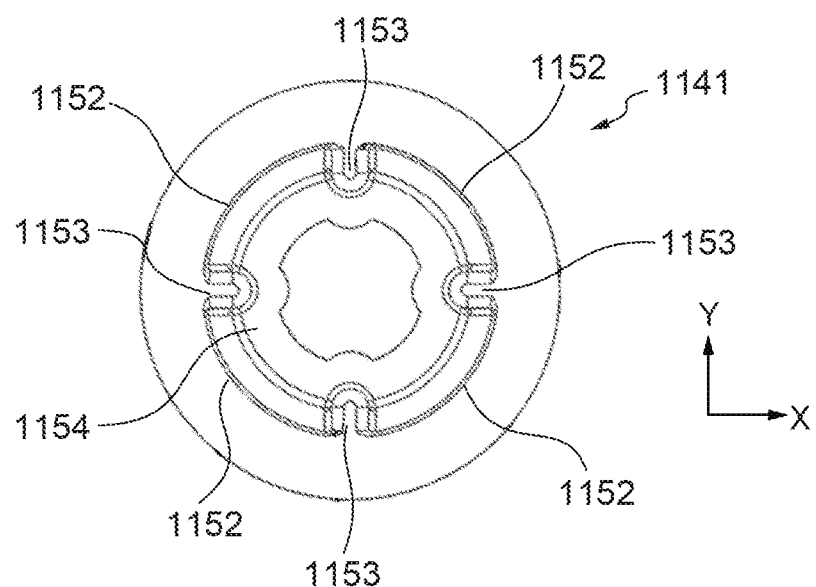
FIG. 18A is a front view of a damper fitted in the apparatus body communication circuit board.

FIG. 18A is a view of the damper 1141 as viewed from the front side of the image capturing apparatus body 1101. The damper 1141 has board fitting portions 1152, board fitting grooves 1153, and a metal plate contact portion 1154. The board fitting portions 1152 are fitted in the holes 1151 formed in the body communication circuit board 1130. The board fitting grooves 1153 have a function of being deformed when external forces are applied to the dampers 1141 to thereby absorb the external forces. The metal plate contact portion 1154 is brought into contact with the retainer metal plate 1134 when assembled into the image capturing apparatus body 1101.

Figure 18B:
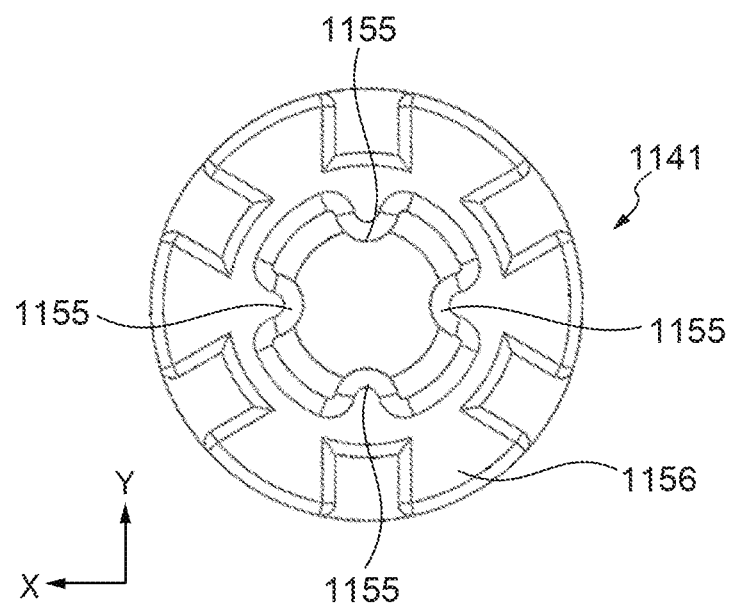
FIG. 18B is a rear view of the damper fitted in the apparatus body communication circuit board.

FIG. 18B is a view of the damper 1141 as viewed from the rear side of the image capturing apparatus body 1101. The damper 1141 is provided with body fitting bearing ribs 1155. The body fitting bearing ribs 1155 are fitted on the shafts 1150 (see FIG. 19) provided on the body rear-side cover 1100. Further, the damper 1141 has a body receiving surface 1156 brought into contact with the body rear-side cover 1100.

Figure 19:
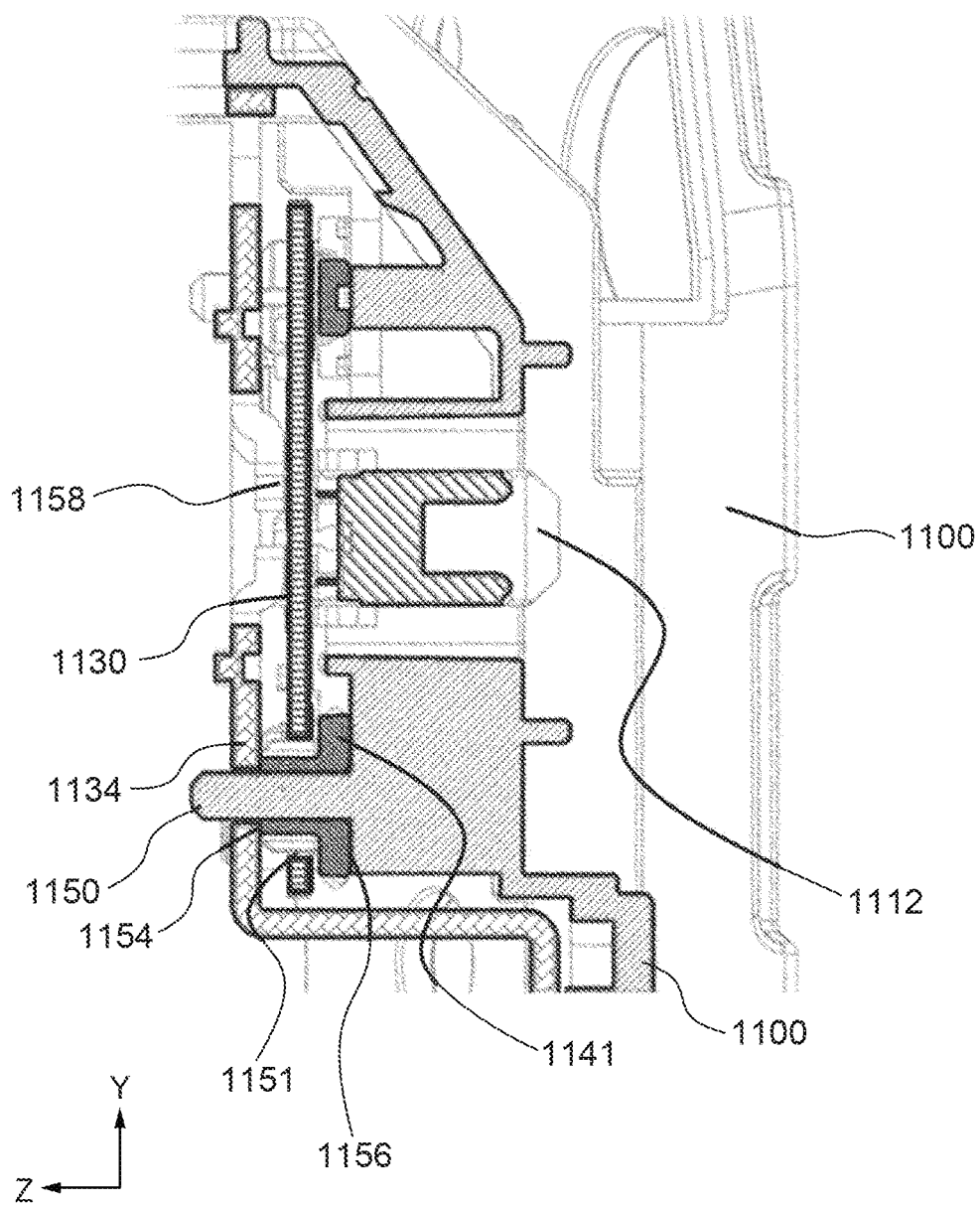
FIG. 19 is a cross-sectional view taken along line B-B in FIG. 13.

FIG. 19 is a cross-sectional view taken along line B-B in FIG. 13, showing a state of the image capturing apparatus body 1101 in which the body communication circuit board 1130, the holes 1151, the expansion connector 1112, the dampers 1141, the body rear-side cover 1100, and the retainer metal plate 1134 are assembled.

On a surface of the body communication circuit board 1130 opposite to a surface thereof where the expansion connector 1112 is mounted, a board receiving portion 1158 provided on the retainer metal plate 1134 is disposed. When the expansion connector 1112 is pushed toward the inside of the image capturing apparatus body 1001 by an external force, the body communication circuit board 1130 is brought into contact with the board receiving portion 1158, thereby preventing the expansion connector 1112 from being pushed into the inside of the image capturing apparatus body 1001. The dampers 1141 are fitted on respective associated ones of the shafts 1150 provided on the body rear-side cover 1100 and are sandwiched between the retainer metal plate 1134 and the body communication circuit board 1130, thereby being positioned.

When connecting a function expansion unit to the image capturing apparatus body 1001, a force is applied to the expansion connector 1112 mounted on the body communication circuit board 1130. At this time, the dampers 1141 are elastically deformed, whereby the expansion connector 1112 is moved by an amount of elastic deformation of the dampers 1141. This makes it possible to connect the function expansion unit to the image capturing apparatus body 1001, without breaking the body communication circuit board 1130, the expansion connector 1112, and the function expansion unit.

Note that the expansion connector 1112 is mounted on the substantially central portion of the body communication circuit board 1130 such that a longitudinal direction thereof is parallel to a longitudinal direction of the body communication circuit board 1130. Further, the expansion connector 1112 is mounted on the body communication circuit board 1130 such that it is substantially entirely received within a rectangle formed on an X-Y plane by the four dampers 1141. Therefore, it is possible to receive a force applied to the expansion connector 1112 substantially equally by the four dampers 1141, thereby more effectively preventing the breakage of the body communication circuit board and the expansion connector 1112.

Next, a description will be given of the viewfinder unit 4000 as one of the function expansion units to be removably attached to the image capturing apparatus body 1001. In the following description related to the viewfinder unit 4000, the viewfinder unit 4000 is referred to as "the VF unit 4000", and components of the VF unit 4000 are named with a prefix "VF" indicating that they are components of the VF unit 4000.

Figure 20:
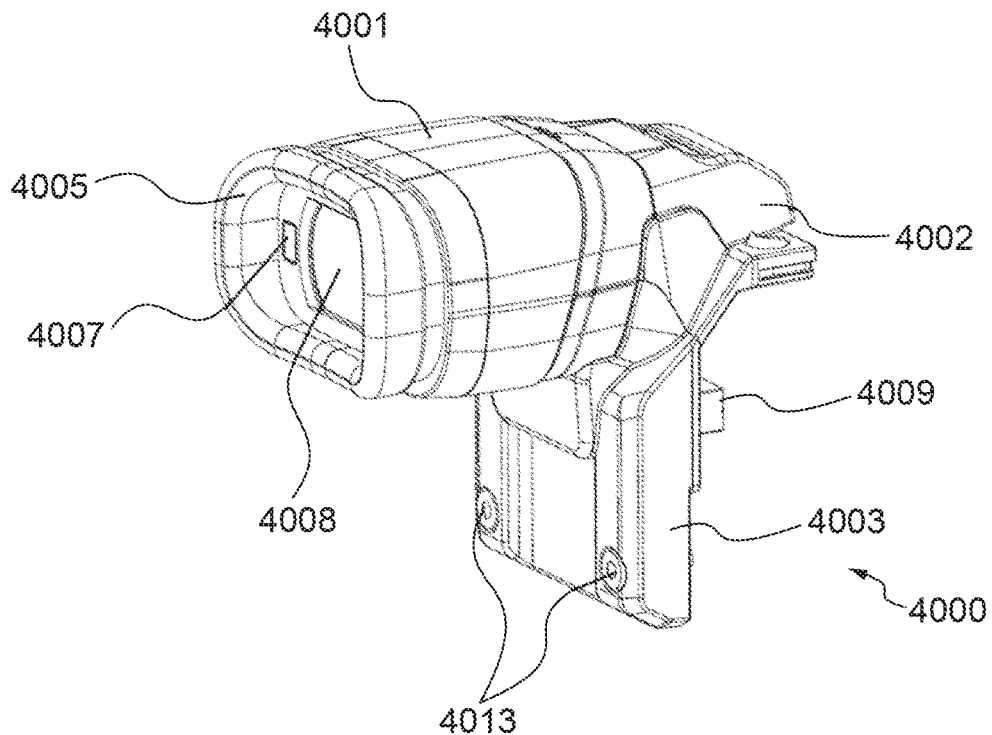
FIG. 20 is a perspective view of a viewfinder unit as viewed from the rear and above.
Figure 21:
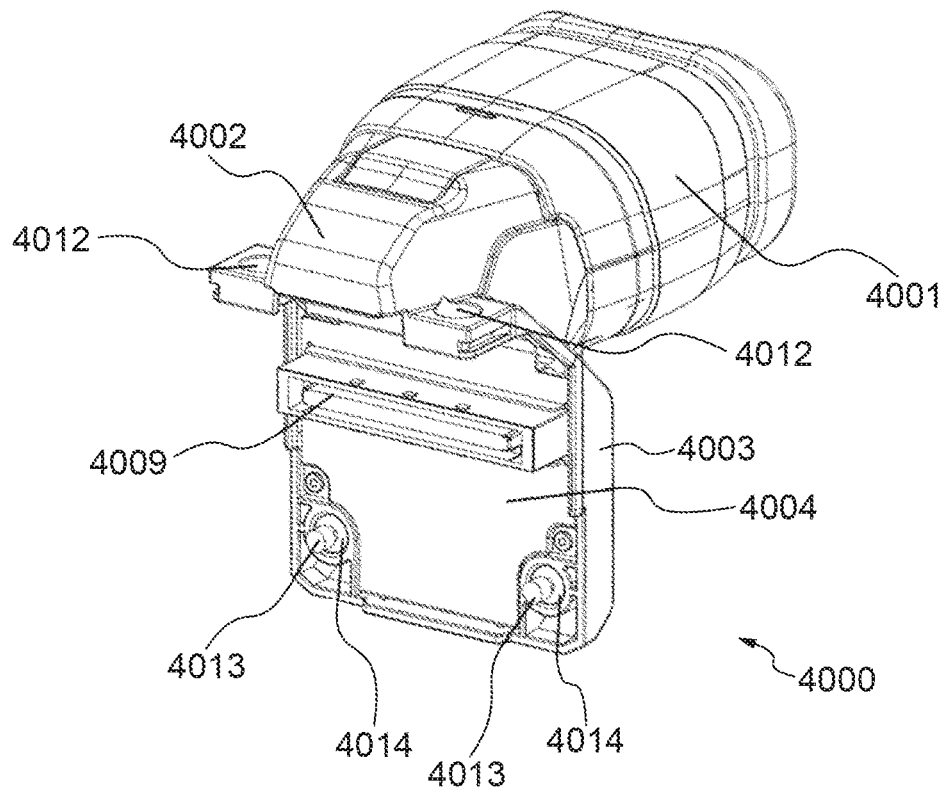
FIG. 21 is a perspective view of the viewfinder unit as viewed from the front and above.
Figure 22:
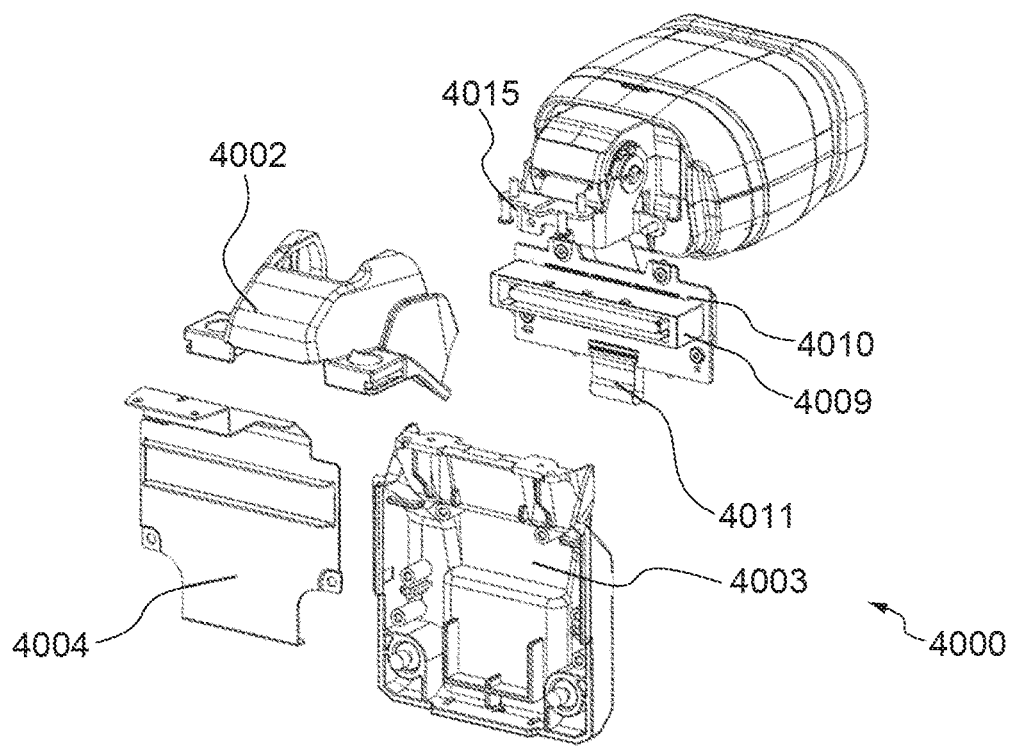
FIG. 22 is an exploded perspective view of the viewfinder unit.

FIG. 20 is a perspective view of the VF unit 4000 as viewed from the rear and above. FIG. 21 is a perspective view of the VF unit 4000 as viewed from the front and above. FIG. 22 is an exploded perspective view of the VF unit 4000. Note that the VF unit 4000 does not appear in FIG. 1, and how the VF unit 4000 is attached to the image capturing apparatus body 1001 will be described hereinafter.

The VF unit 4000 includes a VF upper cover 4002, a VF rear cover 4003, a VF front cover 4004, a viewfinder section 4001, and a VF connector 4009. The viewfinder section 4001 includes an eye cup 4005, an eye contact detection sensor protection plate 4007, a lens protection plate 4008, and a display section 4006 (see FIG. 26). Behind the eye contact detection sensor protection plate 4007, an infrared eye contact detection sensor (not shown) is disposed. The display section 4006 is an organic EL panel or a liquid crystal panel. The VF rear cover 4003 has VF fixing bolts 4013 arranged at a lower portion thereof. The VF fixing bolts 4013 are mounted on the VF rear cover 4003 such that bolt fixing rings 4014 prevent detachment of the VF fixing bolts 4013 from the VF rear cover 400.

The VF connector 4009 protrudes forward from an opening formed in the VF front cover 4004 and is electrically connected to the image capturing apparatus body 1001 for electrical communication and power transfer therewith. The VF front cover 4004 is made of a metal plate and is bent at locations immediately below and above the VF connector 4009 for protection of the VF connector 4009. At two locations forward of the VF upper cover 4002, VF fixing holes 4012 are provided. Upper fixing bolts 4150 (see FIG. 24) as an example of fastening members disposed through the VF fixing holes 4012 fix the VF unit 4000 to the image capturing apparatus body 1001.

The VF connector 4009 is mounted on a VF circuit board 4010, and one end of an FPC 4011 is electrically connected to the VF circuit board 4010, and the other end (not shown) of the FPC 4011 is electrically connected to a circuit board (not shown) inside the viewfinder section 4001, whereby power supply to the infrared eye contact detection sensor and the display section 4006 is performed.

Figure 23:
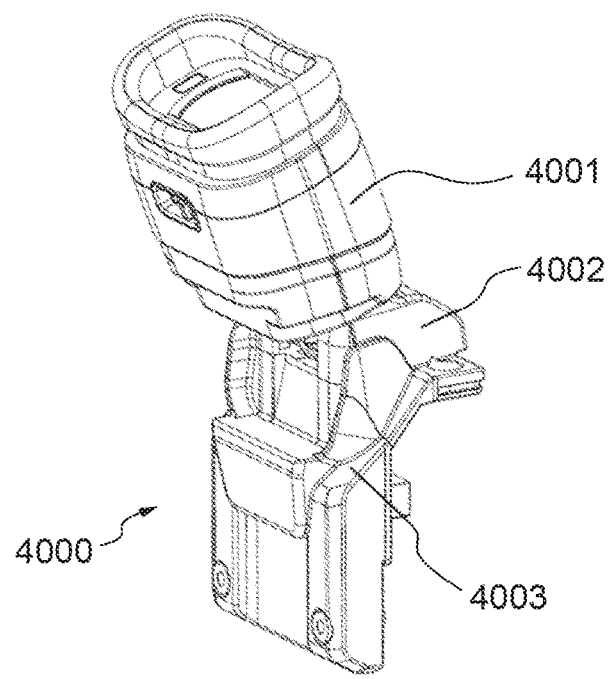
FIG. 23 is a perspective view of the viewfinder unit in a state in which a viewfinder section thereof has been flipped up.

The viewfinder section 4001 is provided with a VF hinge 4015. FIG. 23 shows the VF unit 4000 in a state the viewfinder section 4001 has been flipped up from the state shown in FIG. 20. The viewfinder section 4001 is capable of rotating about the rotational axis of the VF hinge 4015.

Figure 24:
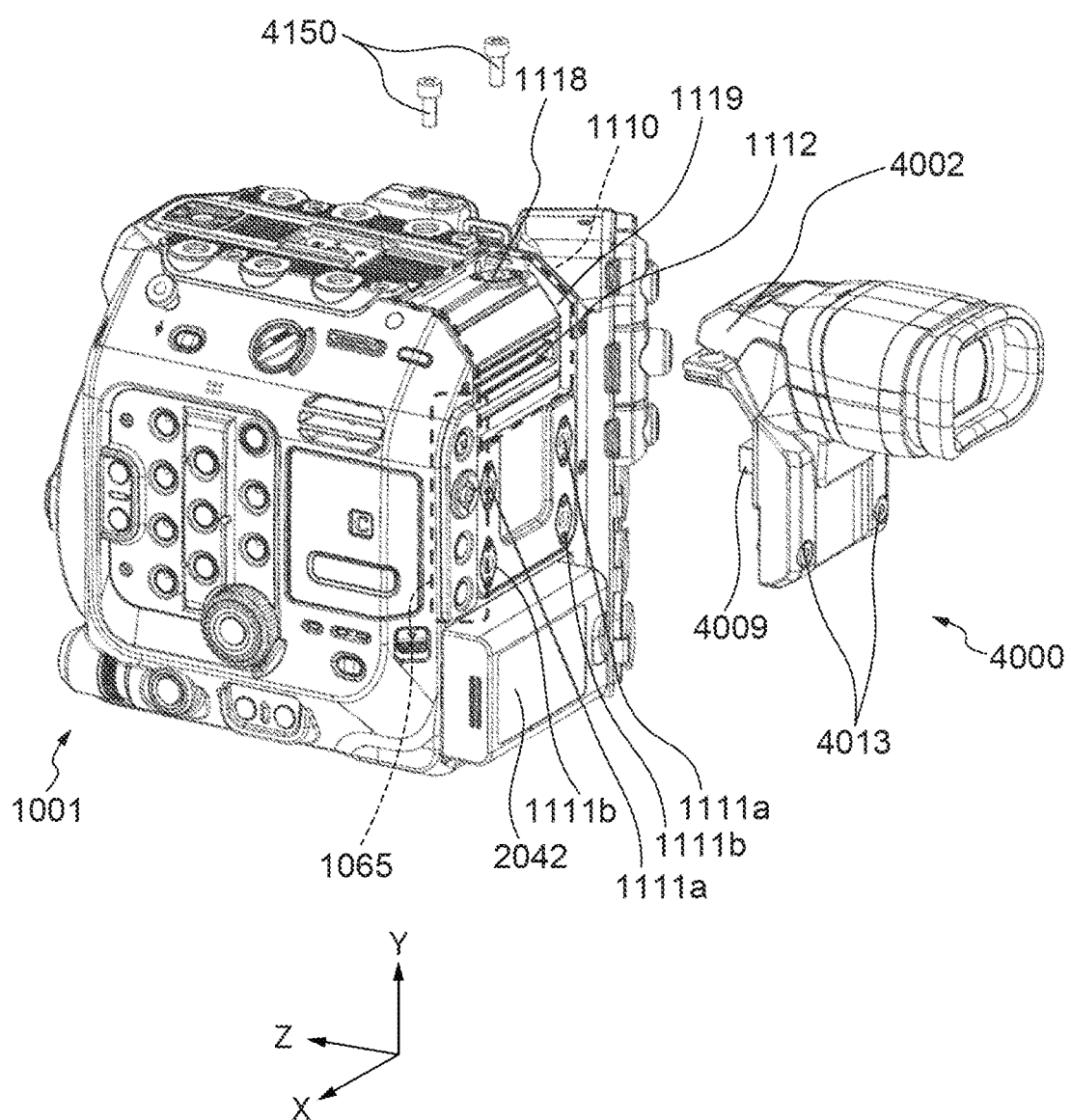
FIG. 24 is a view showing a positional relationship between the image capturing apparatus body and the viewfinder unit before the viewfinder unit is attached to the image capturing apparatus body.
Figure 25A:
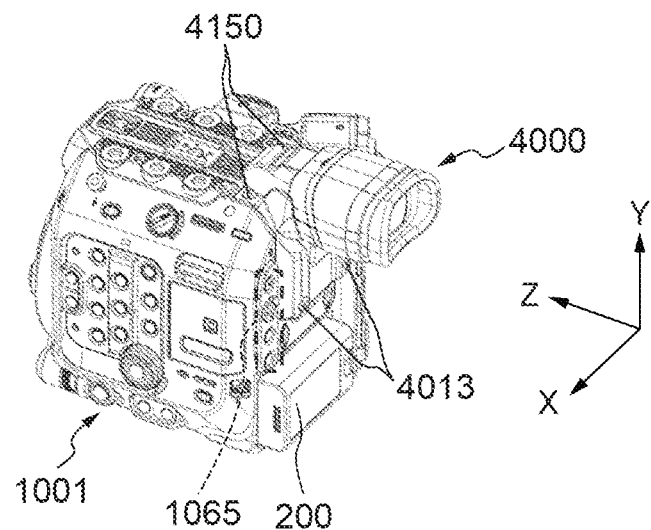
FIGS. 25A to 25C are perspective views of the image capturing apparatus body in a state in which the viewfinder unit is attached thereto.
Figure 25B:
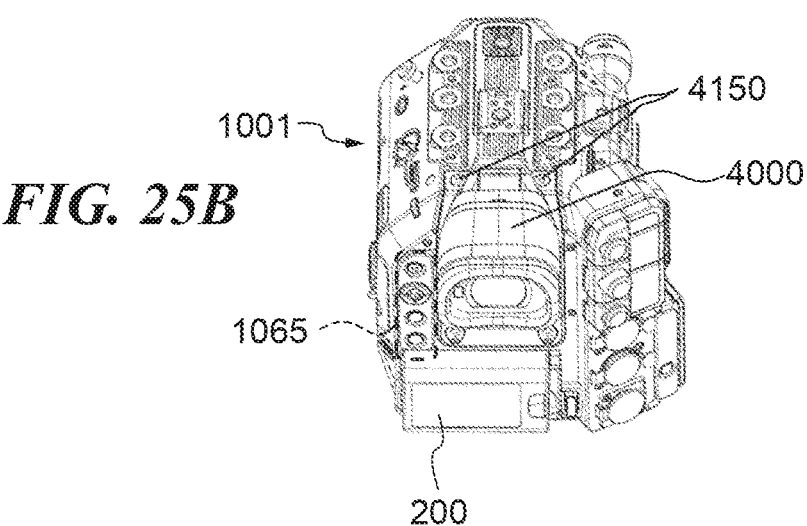
Figure 25C:
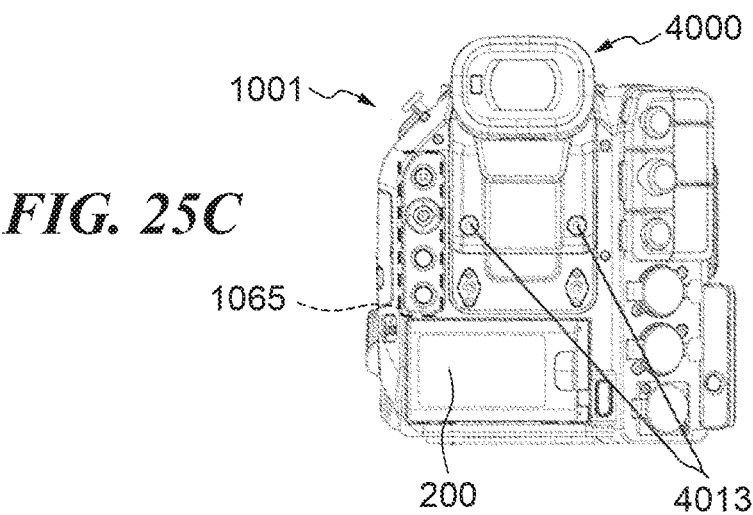

FIG. 24 is a view useful in explaining a positional relationship between the image capturing apparatus body 1001 and the VF unit 4000 before the VF unit 4000 is attached to the image capturing apparatus body 1001. FIGS. 25A to 25C are perspective views of the image capturing apparatus body 1001 in a state in which the VF unit 4000 is attached thereto, as viewed from the rear. In IGS. 25A to 25C, angles at which the VF unit 4000 is viewed are different from each other.

The VF unit 4000 is attached to the image capturing apparatus body 1001 from the rear. At this time, the body communication circuit board 1130 having the expansion connector 1112 mounted thereon can be moved by the amount of elastic deformation which the dampers 1141 can perform, and hence is moved in a manner pulled by the VF connector 4009. This accommodates positional shift of the VF unit 4000 when mounting the same, thereby enabling positive connection of the two connectors 1112 and 4009 without applying large load thereto, which makes it possible to achieve high reliability.

After the VF connector 4009 is connected to the expansion connector 1112, the upper fixing bolts 4150 are inserted through the VF fixing holes 4012 and screwed into the upper fixing portions 1118. This firmly fixes the VF upper cover 4002 of the VF unit 4000 to the image capturing apparatus body 1001 in the vertical direction (Y-axis direction). At the same time, the VF upper cover 4002 is mounted in the mounting recess 1110 such that it is enclosed with the walls 1119, and hence is restricted in movement in the left-right direction (X-axis direction).

Also, the VF fixing bolts 4013 are screwed into the upper rear-side mounting portions 1111a. This firmly fixes the VF rear cover 4003 to the image capturing apparatus body 1001 in the front-rear direction (Z-axis direction). At the same time, the VF rear cover 4003 is mounted on the image capturing apparatus body 1001 such part thereof is enclosed with the walls 1119 of the mounting recess 1119. Therefore, the VF rear cover 4003 is restricted in movement in the left-right direction (X-axis direction). Thus, the VF unit 4000 is firmly mounted on the image capturing apparatus body 1001.

The VF unit 4000 is fixed to the rear upper part of the image capturing apparatus body 1001, and hence it is possible to use the VF unit 4000 while using the battery 2042. Also, it is possible to easily replace the battery 2042 by another. Further, the body rear-side operation section 1065 is arranged on a positive X-axis direction side of the rear-side mounting portions 1111 (right side of the image capturing apparatus body 1001 as viewed from the front), and hence it does not interfere with the VF unit 4000 when mounted on the image capturing apparatus body 1001. Therefore, the user can operate the body rear-side operation section 1065 without any inconvenience in a state in which the VF unit 4000 is mounted on the image capturing apparatus body 1001.

Figure 26:
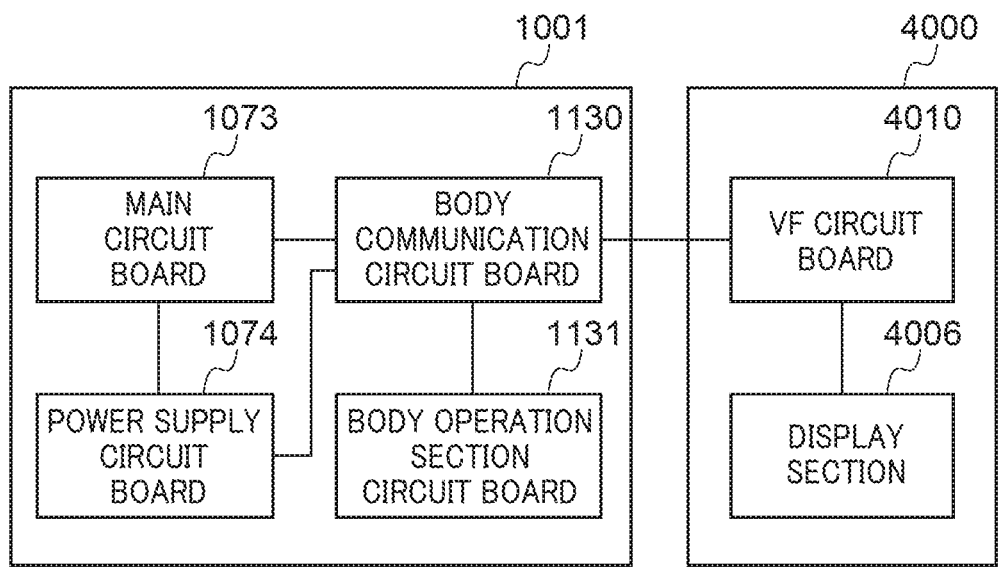
FIG. 26 is a partial functional block diagram of the image capturing apparatus body and the viewfinder unit.

FIG. 26 is a partial functional block diagram of the image capturing apparatus body 1001 and the VF unit 4000. When the VF unit 4000 is attached to the image capturing apparatus body 1001, the expansion connector 1112 mounted on the body communication circuit board 1130 and the VF connector 4009 mounted on the VF circuit board 4010 are electrically connected to each other. Then, the CPU 2020 mounted on the main circuit board 1073 of the image capturing apparatus body 1001 detects attachment of the VF unit 4000 and transmits video data and the like to the VF unit 4000. The display section 4006 of the VF unit 4000 displays an operating status of the image capturing apparatus 1001, etc., according to signals received from the image capturing apparatus 1001, as on-screen display information.

Next, a description will be given of a transmission unit 4100 as one of the function expansion units to be removably attached to the image capturing apparatus body 1001. In the following description related to the transmission unit 4100, components of the transmission unit 4100 are named with a prefix "TR" indicating that they are components of the transmission unit 4100.

Figure 27:
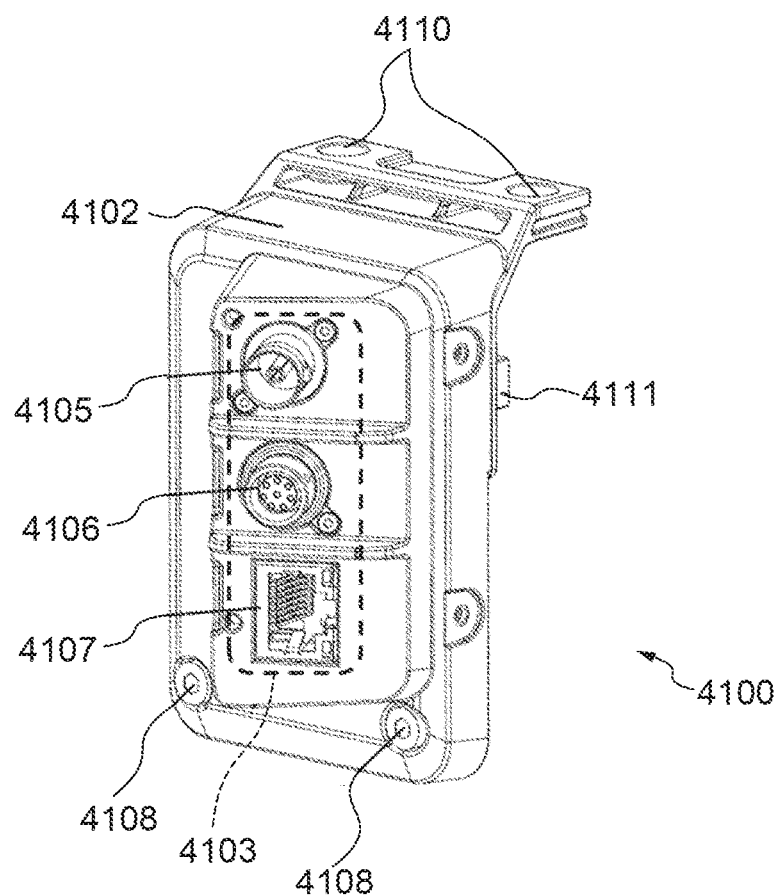
FIG. 27 is a perspective view of a transmission unit as viewed from the rear and above.
Figure 28:
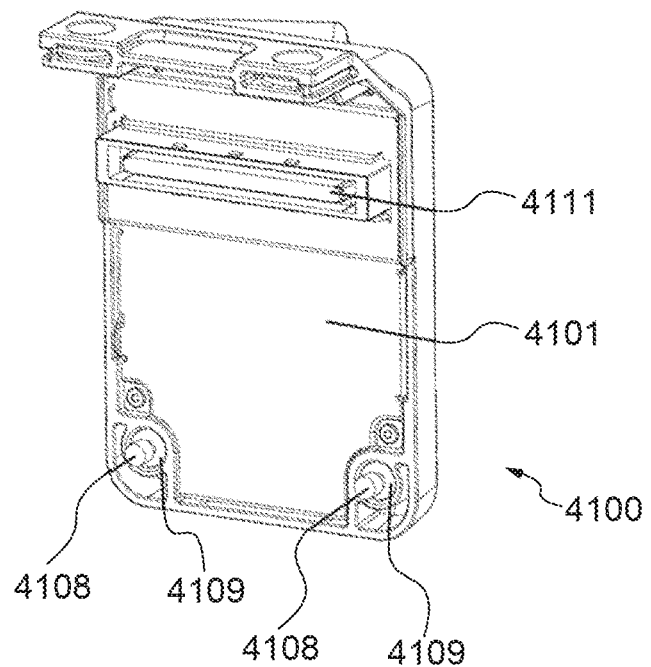
FIG. 28 is a perspective view of the transmission unit as viewed from the front and above.
Figure 29:
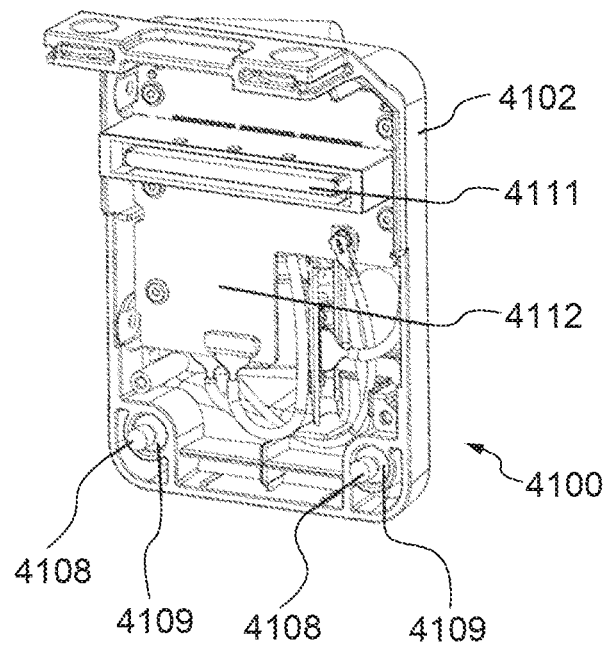
FIG. 29 is a perspective view of the transmission unit in a state in which a transmission unit front cover is removed the transmission unit in the FIG. 28 state.

FIG. 27 is a perspective view of the transmission unit 4100 as viewed from the rear and above. FIG. 28 is a perspective view of the transmission unit 4100 as viewed from the front and above. FIG. 29 is a perspective view of the transmission unit 4100 in a state in which the TR cover 4101 is removed from its state shown in FIG. 28. Note that the transmission unit 4100 does not appear in FIG. 1, and how the transmission unit 4100 is attached to the image capturing apparatus body 1001 will be described hereinafter with reference to FIGS. 31 to 32C.

The transmission unit 4100 is an function expansion unit that transmits a shot video to a remote place. The transmission unit 4100 includes a TR rear cover 4102. The TR cover 4102 is provided with a TR terminal group 4103, and terminals of the TR terminal group 4103 can be connected to cables and the like from an external device, whereby the transmission unit 4100 can be connected to the external device. The terminals of the TR terminal group 4103 are electrically connected to the TR connector 4111 inside the transmission unit 4100.

The TR terminal group 4103 includes a GEN lock terminal 4105, a controller terminal 4106, and a wired LAN terminal 4107. The GEN lock terminal 4105 is connectable to a BNC cable, and the GEN lock terminal 4105 is a terminal for outputting a GEN lock signal to an external device from the image capturing apparatus body 1001 via the BNC cable. The controller terminal 4106 is connectable to a predetermined cable and the image capturing apparatus body 1001 and an external controller transmit and receive control signals via the cable to and from each other. By transmitting a control signal from the external controller to the image capturing apparatus body 1001 through the controller terminal 4106 and the TR connector 4111, the external controller can control the image capturing apparatus body 1001. The wired LAN terminal 4107 is connectable to a cable and the image capturing apparatus body 1001 and an external device transmit and receive control signals via the cable to and from each other. The external controller transmits a control signal to the image capturing apparatus body 1001 through the controller terminal 4106 and the TR connector 4111, whereby the external connector can control the image capturing apparatus body 1001. The wired LAN terminal 4107 is connectable to a LAN cable and the image capturing apparatus body 1001 can be connected to the Internet via the LAN cable.

At two locations in a lower portion of the TR rear cover 4102, there are provided TR fixing bolts 4018 for fixing the transmission unit 4100 to the image capturing apparatus body 1001 such that bolt fixing rings 4109 prevent the TR fixing bolts 4018 from being removed from the TR rear cover 4102. Further, at two locations in a front portion of the TR rear cover 4102, TR fixing holes 4110 are formed. The upper fixing bolts 4150 (see FIG. 31) inserted through the VR fixing holes 4110 fix the TR unit 4100 to the image capturing apparatus body 1001.

On a front side of the transmission unit 4100, the TR connector 4111 is provided for electrical communication and power supply when mounted on the image capturing apparatus body 1001 such that it protrudes forward from within an opening formed in the TR front cover 4101. The TR front cover 4101 is made of a metal plate and is bent at locations immediately below and above the TR connector 4111 for protection of the TR connector 4111.

Inside the transmission unit 4100, a TR circuit board 4112 having the TR connector 4111 mounted thereon is disposed. The GEN lock terminal 4105, the controller terminal 4106, and the wired LAN terminal 4107 are electrically connected to the TR circuit board 4112 and the TR connector 4111. Power is supplied from the image capturing apparatus body 1001 through the TR connector 4111 to the transmission unit 4100, whereby the transmission unit 4100 is made operable.

Figure 30:
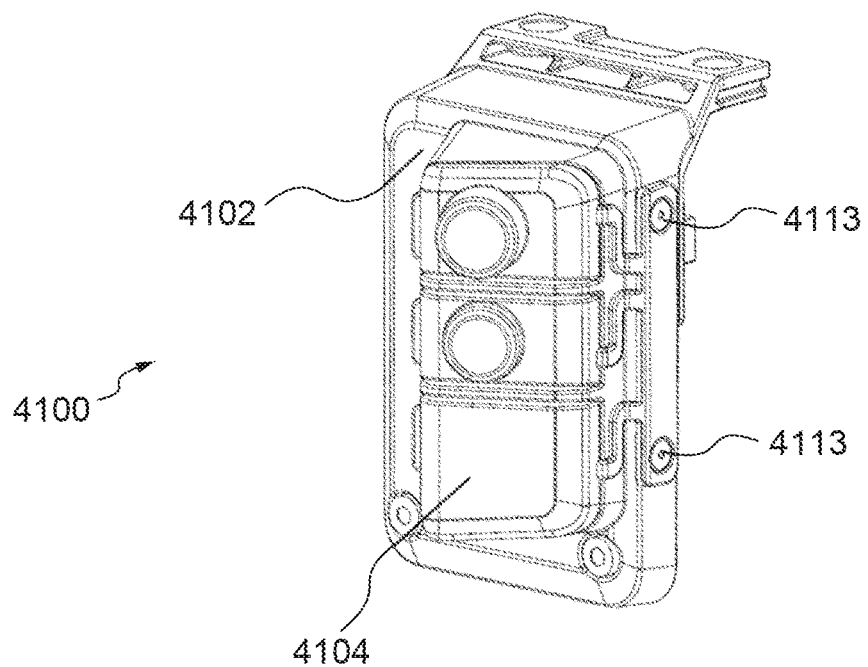
FIG. 30 is a perspective view of the transmission unit in a state in which a TR protection cover group is attached to the transmission unit in the FIG. 27 state.

FIG. 30 is a perspective view of the transmission unit 4100 in a state in which a protection cover group 4104 is attached to the TR terminal group 4103. When the TR terminal group 4103 is not used, the protection cover group 4104 is attached thereto using cover fixing screws 4113, whereby the terminals of the TR terminal group 4103 can be protected.

Figure 31:
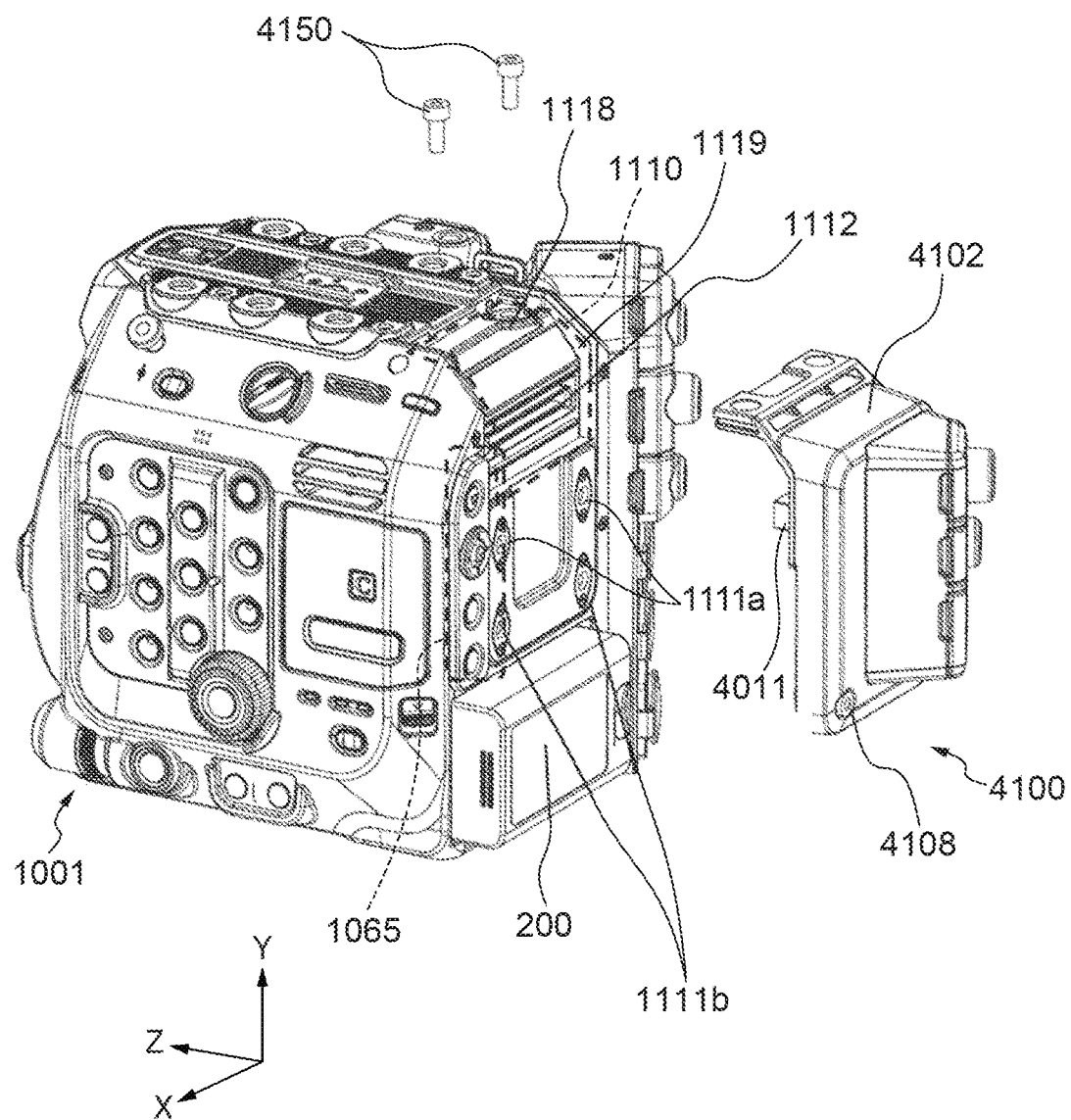
FIG. 31 is a view showing a positional relationship between the image capturing apparatus body and the transmission unit before the transmission unit is attached to the image capturing apparatus body.
Figure 32A:
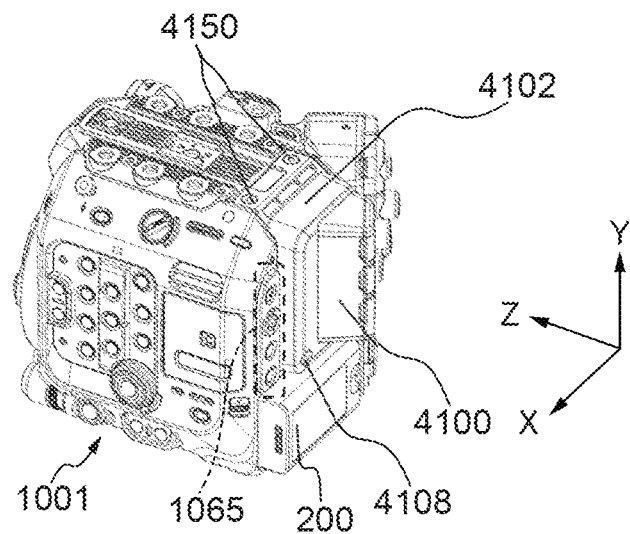
FIGS. 32A to 32C are perspective views of the image capturing apparatus body in a state in which the transmission unit is attached thereto.
Figure 32B:
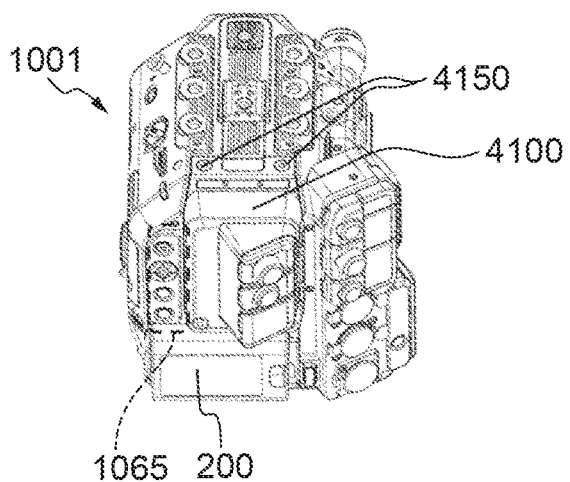
Figure 32C:
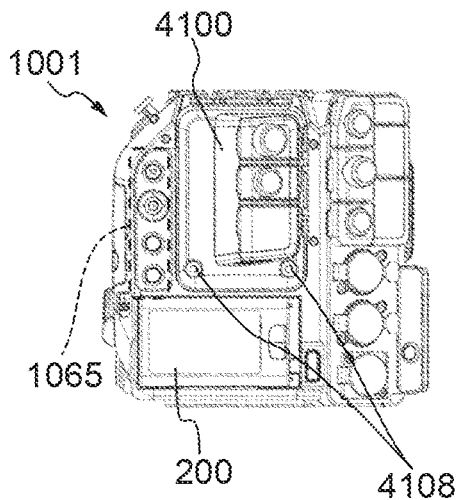

FIG. 31 is a view useful in explaining a positional relationship between the image capturing apparatus body 1001 and the transmission unit 4100 before the transmission unit 4100 is attached to the image capturing apparatus body 1001. FIGS. 32A to 32C are perspective views of the image capturing apparatus body 1001 in a state in which the transmission unit 4100 is attached thereto, as viewed from the rear. In FIGS. 32A to 32C, angles at which the transmission unit 4100 is viewed are different from each other.

The transmission unit 4100 is attached to the image capturing apparatus body 1001 from the rear. At this time, the body communication circuit board 1130 having the expansion connector 1112 mounted thereon can be moved by the amount of elastic deformation which the dampers 1141 can perform, and hence is moved in a manner pulled by the TR connector 4111. This accommodates positional shift of the transmission unit 4100 when mounting the same, thereby enabling positive connection of the two connectors 1112 and 4111 without applying large load thereto, which makes it possible to achieve high reliability.

After the TR connector 4111 is connected to the expansion connector 1112, the upper fixing bolts 4150 are inserted through the TR fixing holes 4110 and screwed into the upper fixing portions 1118. This firmly fixes the TR upper cover 4102 to the image capturing apparatus body 1001 in the vertical direction (Y-axis direction). At the same time, the TR upper cover 4102 is mounted in the mounting recess 1110 such that it is enclosed with the walls 1119, and hence is restricted in movement in the left-right direction (X-axis direction). Also, the TR fixing bolts 4108 are screwed into the lower rear-side mounting portions 1111*b*. This firmly fixes the TR rear cover 4102 to the image capturing apparatus body 1001 in the front-rear direction (Z-axis direction) as well. Thus, the transmission unit 4100 is firmly attached to the image capturing apparatus body 1001.

The transmission unit 4100 is fixed to the rear upper part of the image capturing apparatus body 1001, and hence it is possible to use the transmission unit 4100 while using the battery 2042. Also, it is possible to easily replace the battery 2042 by another. Further, the body rear-side operation section 1065 is arranged on a positive X-axis direction side of the rear-side mounting portions 1111 (right side of the image capturing apparatus body 1001 as viewed from the front), and hence it does not interfere with the transmission unit 4100 when mounted on the image capturing apparatus body 1001. Therefore, the user can operate the body rear-side operation section 1065 without any inconvenience in a state in which the transmission unit 4100 is mounted on the image capturing apparatus body 1001.

Figure 33:
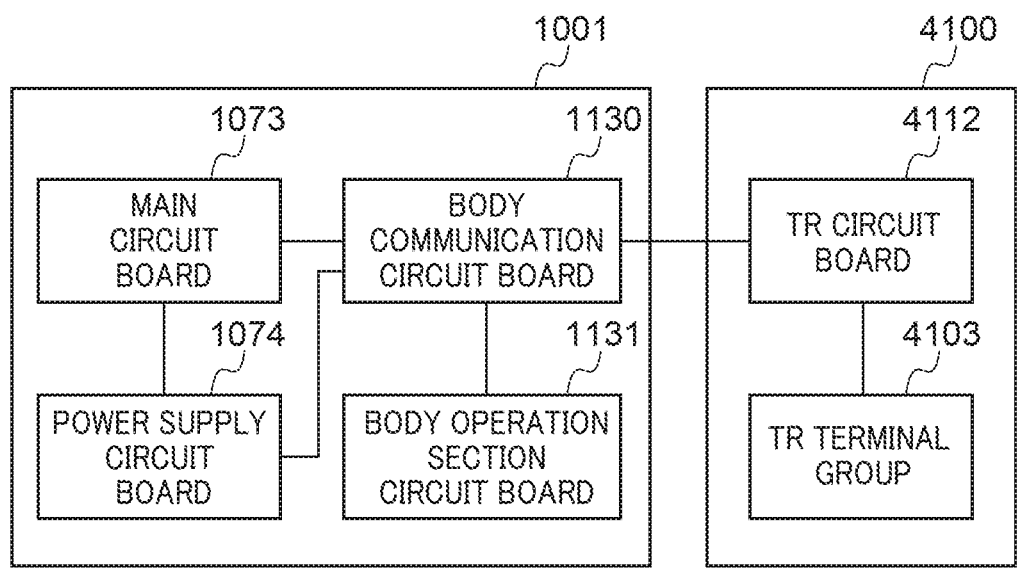
FIG. 33 is a partial functional block diagram of the image capturing apparatus body and the transmission unit.

FIG. 33 is a partial functional block diagram of the image capturing apparatus body 1001 and the transmission unit 4100. When the transmission unit 4100 is attached to the image capturing apparatus body 1001, the expansion connector 1112 mounted on the body communication circuit board 1130 and the TR connector 4111 mounted on the TR circuit board 4112 are electrically connected to each other. Then, the CPU 2020 mounted on the main circuit board 1073 detects attachment of the transmission unit 4100 and is capable of transmitting video data and audio data, and the GEN lock signal, to the TR terminal group 4103 of the transmission unit 4100.

Next, a description will be given of the large-sized expansion unit 4500 (see FIGS. 1 and 2) as one of the function expansion units to be removably attached to the image capturing apparatus body 1001. In the following description related to the large-sized expansion unit 4500, components of the large-sized expansion unit 4500 are named with a prefix "LE" indicating that they are components of the large-sized expansion unit 4500.

Figure 34:
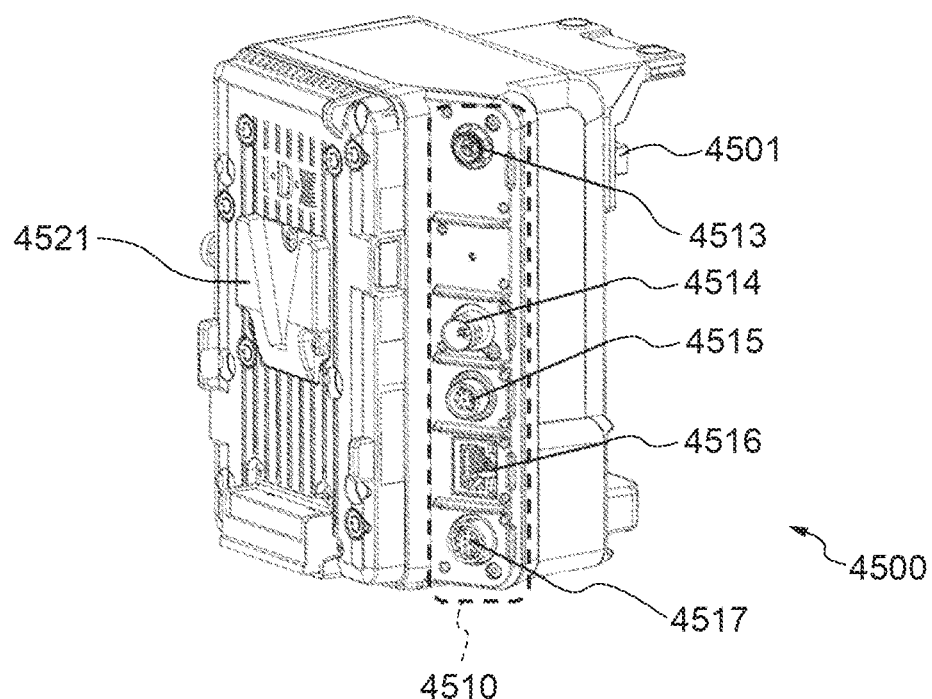
FIG. 34 is a perspective view of a large-sized expansion unit as viewed from the rear and above.
Figure 35:
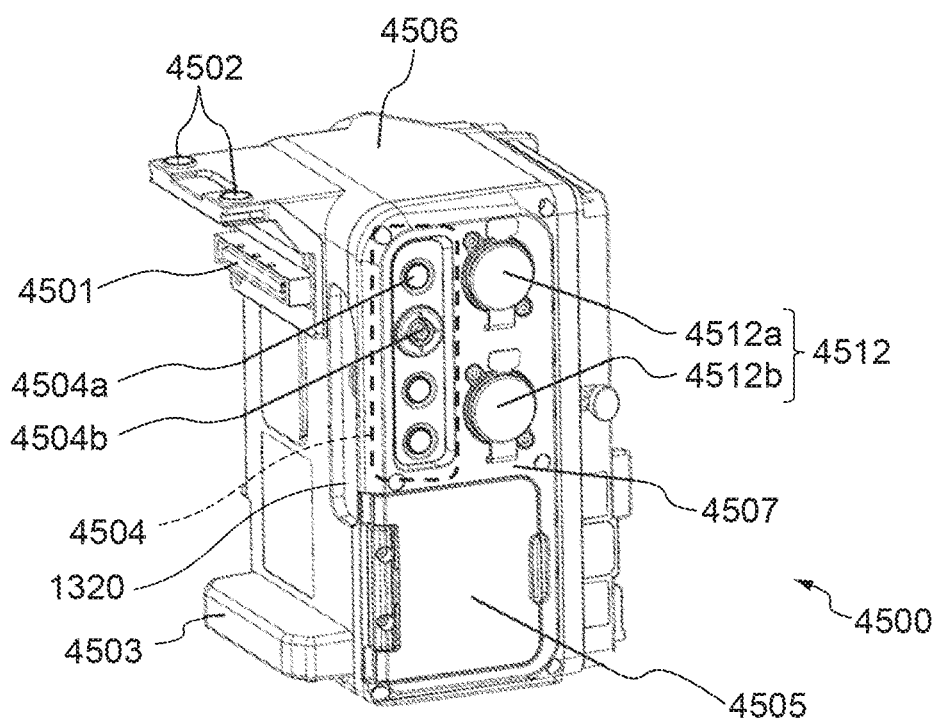
FIG. 35 is a first perspective view of the large-sized expansion unit as viewed from the front and above.
Figure 36:
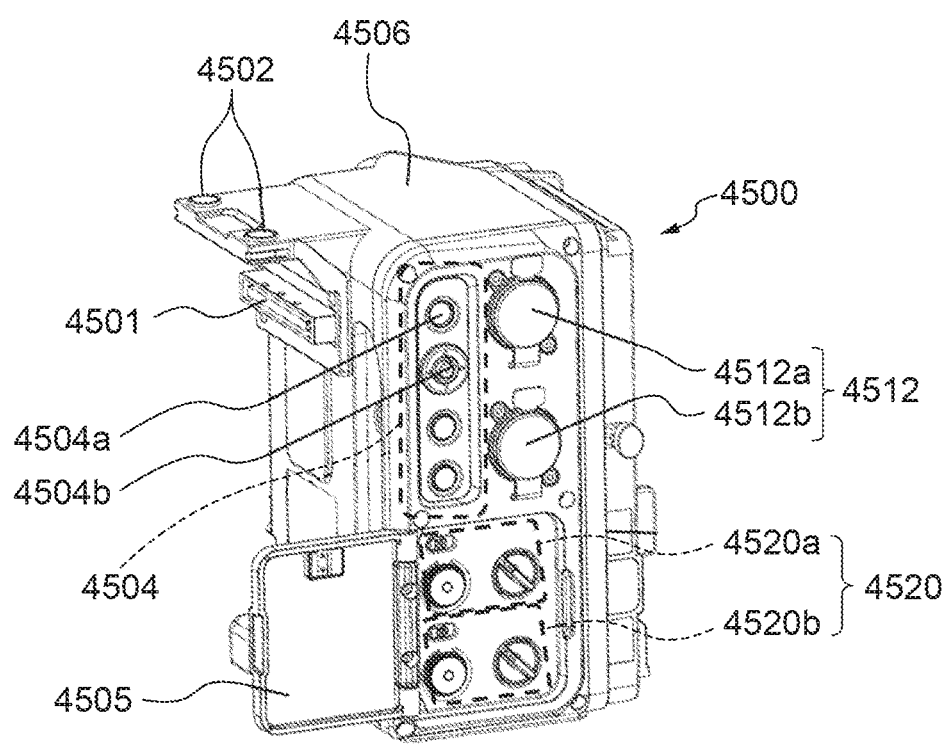
FIG. 36 is a second perspective view of the large-sized expansion unit as viewed from the front and above.
Figure 37:
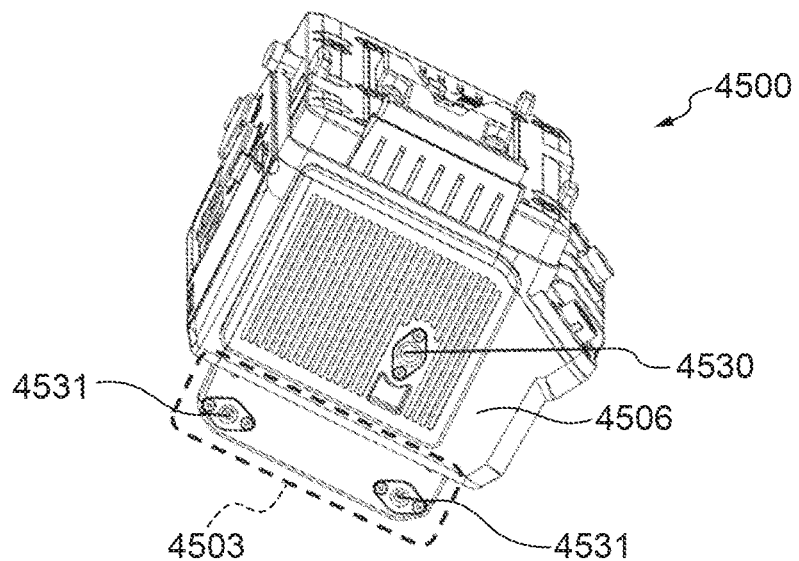
FIG. 37 is a perspective view of the large-sized expansion unit as viewed from the rear and below.

FIG. 34 is a perspective view of the large-sized expansion unit 4500 as viewed from the rear and above. FIGS. 35 and 36 are first perspective views of the large-sized expansion unit 4500 as viewed from the front and above. FIGS. 35 and 36 are different in a opened/closed state of an LE audio cover 4505. FIG. 37 is a perspective view of the large-sized expansion unit 4500 as viewed from the rear and below.

The rear side of the large-sized expansion unit 4500 is provided with an LE terminal group 4510 including a plurality of input/output terminals, and these terminals of the LE terminal group 4510 can be connected to cables from an external device, whereby the functions of the image capturing apparatus body 1001 can be expanded. More specifically, the LE terminal group 4510 includes a power output terminal 4513, a GEN lock terminal 4514, a controller terminal 4515, a wired LAN terminal 4516, and a lens terminal 4517. These terminals are electrically connected to the LE connector 4501 inside the large-sized expansion unit 4500.

The power output terminal 4513 is a terminal for supplying power at a voltage of 24V and at a current of 2 A at the maximum to an external device connected thereto by a cable. The GEN lock terminal 4514 is connectable to a BNC cable, and the GEN lock terminal 4514 is a terminal for outputting a GEN lock signal to an external device from the image capturing apparatus body 1001 via the BNC cable. The controller terminal 4515 is connectable to a predetermined cable and the image capturing apparatus body 1001 and an external controller can transmit and receive control signals via the cable to and from each other. By transmitting a control signal from the external controller to the image capturing apparatus body 1001 through the controller terminal 4515 and the LE connector 4501, the external controller can control the image capturing apparatus body 1001. The wired LAN terminal 4516 is connectable to a LAN cable and the image capturing apparatus body 1001 can be connected to the Internet via the LAN cable. The lens terminal 4517 is connectable to a predetermined cable, and the image capturing apparatus body 1001 and the lens barrel 2100 can communicate with each other via the cable.

The rear side of the large-sized expansion unit 4500 is provided with an LE battery mounting section 4521 for mounting an expansion module battery (not shown) larger in capacity than the battery 2042. Power supplied from the expansion module battery via the LE battery mounting section 4512 is used for driving the large-sized expansion unit 4500, and is supplied to the image capturing apparatus body 1001 via the LE connector 4501 and used for driving the same.

The appearance of the large-sized expansion unit 4500 is formed by an LE front cover 4506, an LE side cover 4507, and the LE battery mounting section 4521. The front side of the large-sized expansion unit 4500 is provided with the LE connector 4501 which protrudes forward from within an opening formed in the LE front cover 4506, and is connected to the image capturing apparatus body 1001. This enables electrical communication and power transfer between the large-sized expansion unit 4500 and the image capturing apparatus body 1001.

Figure 40:
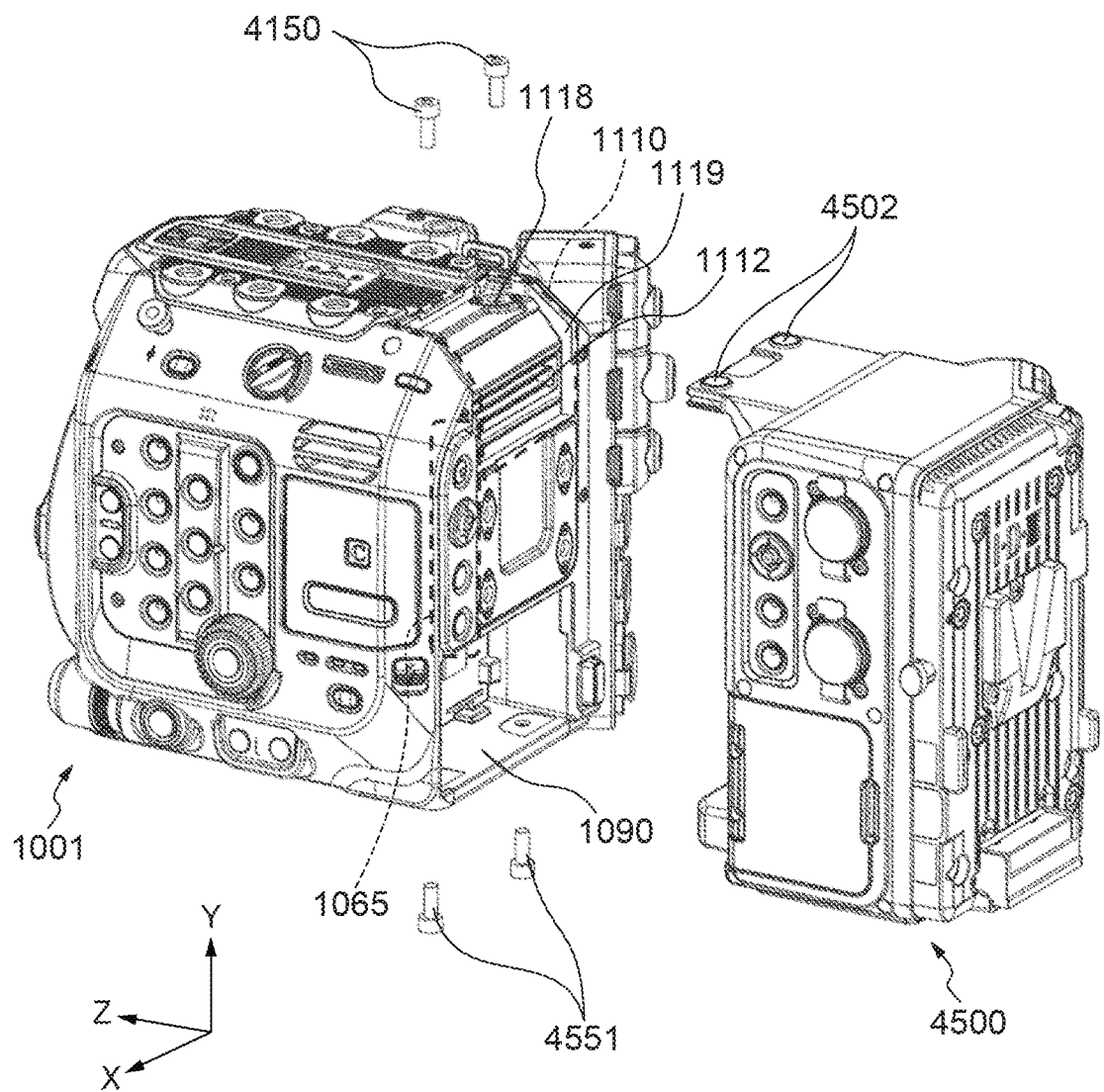
FIG. 40 is a view showing a positional relationship between the image capturing apparatus body and the large-sized expansion unit before the large-sized expansion unit is attached to the image capturing apparatus body.

At the top of the LE front cover 4506, there are provided LE fixing holes 4502 for fixing the large-sized expansion unit 4500 to the image capturing apparatus body 1001 by the upper fixing bolts 4150 (see FIG. 40). Further, at the bottom of the LE front cover 4506, there are provided an LE insertion section 4503.

The LE side cover 4507 is provided with an LE operation section 4504, and an LE microphone terminal 4512 formed by an upper microphone terminal 4512*a* and a lower microphone terminal 4512*b*, and the LE audio cover 4505. The LE microphone terminal 4512 and an external microphone (not shown) are connected to each other using a 3-pin XLR cable, whereby audio signals can be input to the image capturing apparatus boy 1001 from the external microphone. The LE operation section 4504 is a menu-related operation section and includes a menu button 4504*a* and a cross key 4504*b*. By operating the menu button 4504*a*, it is possible to access the menu mode for configuring various settings of the image capturing apparatus body. By operating the cross key 4504*b*, it is possible to move within the menu mode for selection of an item and determine the selection by depression of a center thereof.

At a location inward of the LE audio cover 4505, there is arranged an LE audio switch group 4520 including an upper audio switch group 4520*a* and an lower audio switch group 4520*b* each formed by three switches. The upper audio switch group 4520*a* sets settings of the upper microphone terminal 4512*a*, and the lower audio switch group 4520*b* sets settings of the lower microphone terminal 4512*b*. For example, the upper audio switch group 4520*a* is used for selection of whether or not voltage is to be applied to an external microphone connected to the upper microphone terminal 4512*a*, switching between automatic control and manual control for a recording sound pressure level of the external microphone, and setting of the recording sound pressure level of the external microphone. The lower audio switch group 4520*b* has the same functions as the upper audio switch group 4520*a*, and hence description thereof is omitted.

By closing the LE audio cover 4505, the entirety of the LE audio switch group 4520 is covered, whereby the LE audio switch group 4520 can be protected from outside. The LE audio cover 4505 is made of a transparent or translucent molding material so as to make it possible for a user to easily check a status of each switch when the LE audio cover 4505 is closed.

An LE tripod screw portion 4530 is provided in the bottom of the large-sized expansion unit 4500, and LE fixing screw portions 4531 are provided at opposite ends of the LE insertion section 4503. The LE front cover 4506 is formed of a metallic material and the LE tripod screw portion 4530 and the LE fixing screw portions 4531 are both fixed to the LE front cover 4506.

Figure 38:
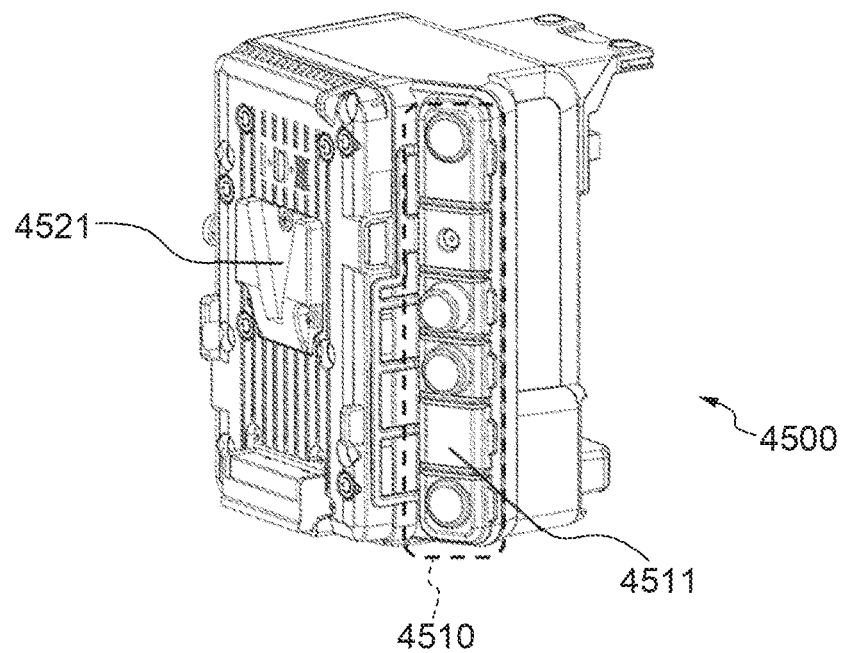
FIG. 38 is a perspective view of the large-sized expansion unit in a state in which an LE protection cover group is attached to the large-sized expansion unit in the FIG. 35 state.

FIG. 38 is a perspective view of the large-sized expansion unit 4500 in a state in which a LE protection cover group 4511 is attached to the LE terminal group 4510. When the LE terminal group 4510 is not used, the LE protection cover group 4511 is attached thereto, whereby the terminals of the LE terminal group 4510 can be protected.

Figure 39:
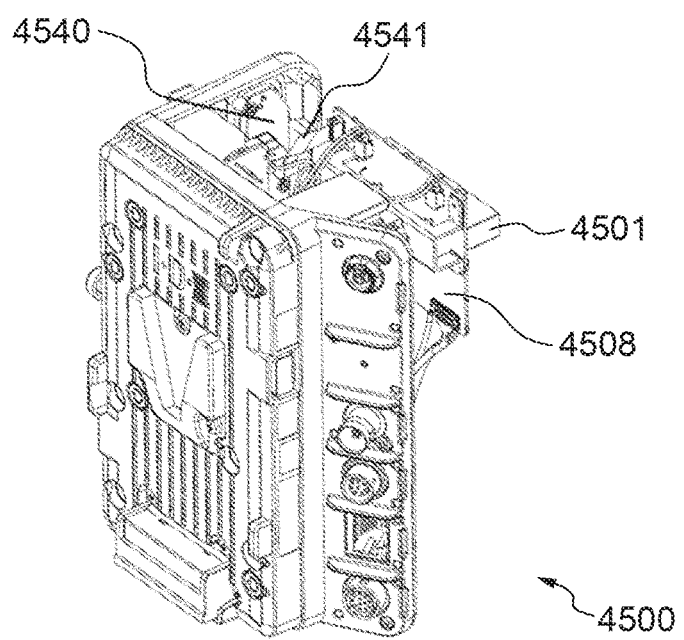
FIG. 39 is a perspective view of the large-sized expansion unit in a state in which the LE protection cover group is removed from the large-sized expansion unit in the FIG. 38 state.

FIG. 39 is a perspective view of the large-sized expansion unit 4500 in a state in which the LE front cover 4506 is removed from the large-sized expansion unit 4500. Inside the large-sized expansion unit 4500, an LE circuit board 4508 having the LE connector 4501 mounted thereon and an LE operation section circuit board 4540 disposed on a reverse side of the LE operation section 4504 are electrically connected by an FFC 4541. A peripheral structure of the LE operation section circuit board 4540 and the LE operation section 4504 is similar to that of the image capturing apparatus body 1001 and hence description thereof is omitted.

Figure 41A:
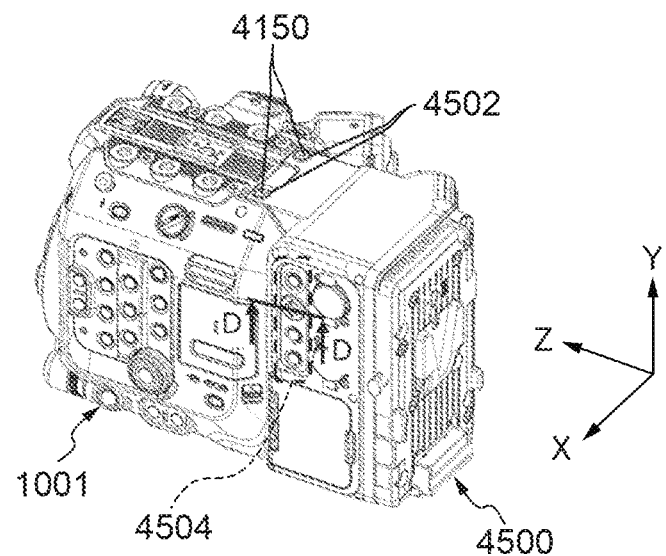
FIGS. 41A to 41C are perspective views of the image capturing apparatus body in a state in which the large-sized expansion unit is attached to the image capturing apparatus body.
Figure 41B:
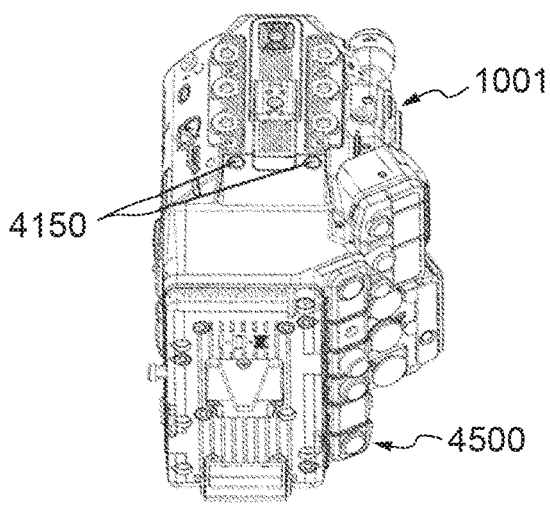
Figure 41C:
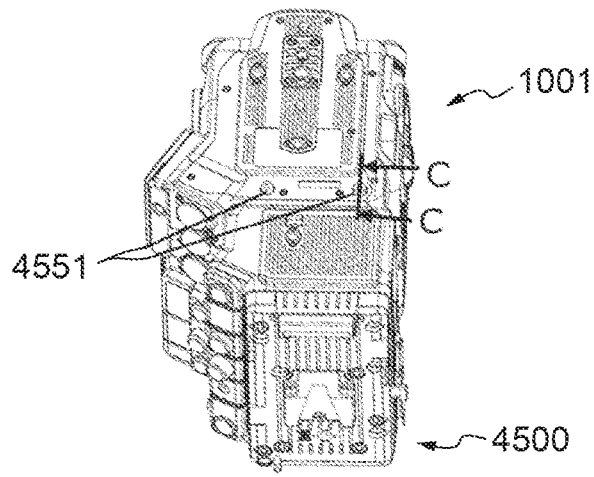

FIG. 40 is a view useful in explaining a positional relationship between the image capturing apparatus body 1001 and the large-sized expansion unit 4500 before the large-sized expansion unit 4500 is attached to the image capturing apparatus body 1001. FIGS. 41A to 41C are perspective views of the image capturing apparatus body 1001 in a state in which the large-sized expansion unit 4500 is attached thereto, as viewed from the rear. In FIGS. 41A to 41C, angles at which the large-sized expansion unit 4500 is viewed are different from each other.

The large-sized expansion unit 4500 is attached to the image capturing apparatus body 1001 from the rear. At this time, the body communication circuit board 1130 having the expansion connector 1112 mounted thereon can be moved by the amount of elastic deformation which the dampers 1141 can perform, and hence is moved in a manner pulled by the LE connector 4501. This accommodates positional shift of the large-sized expansion unit 4500 when mounting the same, thereby enabling positive connection of the connectors without applying large load thereto, which makes it possible to achieve high reliability.

After the LE connector 4501 is connected to the expansion connector 1112, the upper fixing bolts 4150 are inserted through the LE fixing holes 4502 formed in the LE front cover 4506 and screwed into the upper fixing portions 1118. Further, lower fixing bolts 4551 as an example of the fastening members are inserted through holes (through holes) formed in the batter chamber cover 1090 provided in the bottom of the image capturing apparatus body 1001 from outside and screwed into the LE fixing screw portions 4531.

Figure 42:
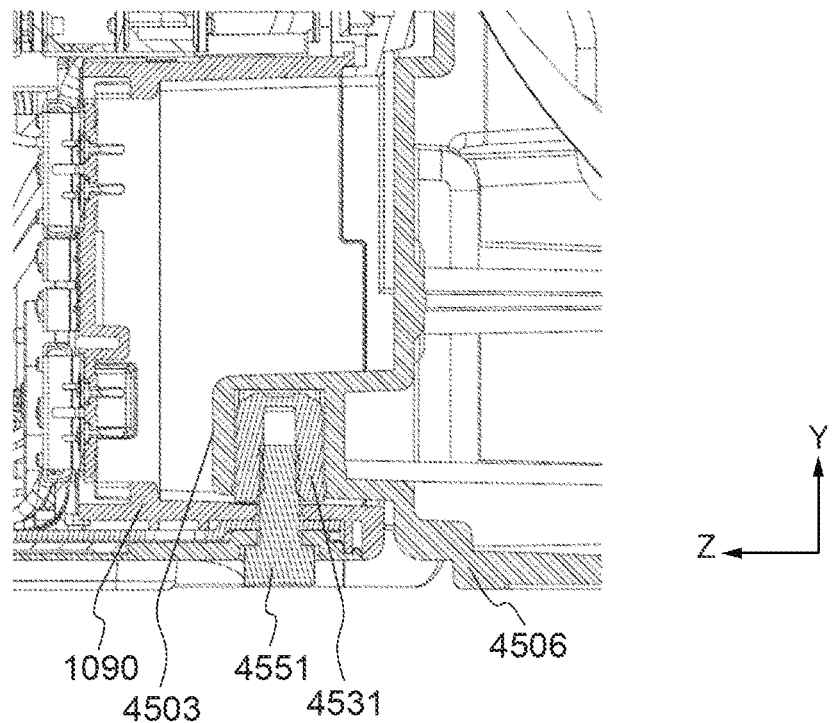
FIG. 42 is a cross-sectional view taken along line C-C in FIG. 41C.

FIG. 42 is a cross-sectional view taken along line C-C in FIG. 41C. The LE insertion section 4503 enters the battery chamber cover 1090 of the image capturing apparatus body 1001 and the lower fixing bolts 4551 are screwed into the LE fixing screw portions 4531 formed in the LE insertion section 4503 and fixed thereto.

An upper portion of the LE front cover 4506 is fitted in the mounting recess 1110 and mounted therein such that it is enclosed by the walls 1119, and hence is restricted in movement in the left-right direction (X-axis direction). Further, the large-sized expansion unit 4500 is firmly fixed to the image capturing apparatus body 1001 by the upper fixing bolts 4150 and the lower fixing bolts 4551 in the vertical direction (Y-axis direction) and the front-rear direction (Z-axis direction) as well.

Figure 43:
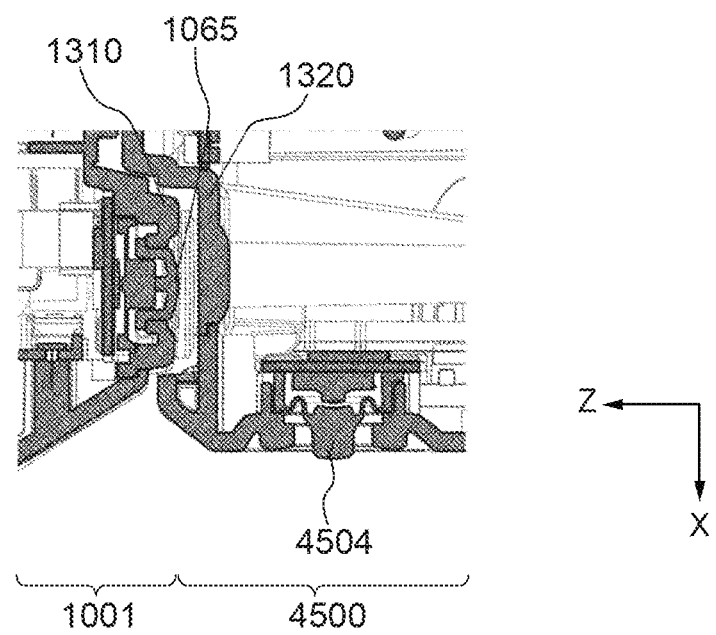
FIG. 43 is a cross-sectional view taken along line D-D in FIG. 41A.

FIG. 43 is a cross-sectional view taken along line D-D in FIG. 41A. When the large-sized expansion unit 4500 is attached to the image capturing apparatus body 1001, and the entire rear cover unit 1006 including the body rear-side operation section 1065 is covered with the large-sized expansion unit 4500, and hence it is impossible to operate the body rear-side operation section 1065. To overcome this inconvenience, in the present embodiment, the large-sized expansion unit 4500 is provided with the LE operation section 4504 having the same functions as those of the body rear-side operation section 1065. This makes it possible to perform the same operations irrespective of whether the large-sized expansion unit 4500 is attached or not. However, the LE operations section 4504 is only required to having at least one function which is the same as one of those of the body rear-side operation section 1065.

Further, the body rear-side operation section 1065 is arranged on the right side of the rear surface of the image capturing apparatus body 1001, and the LE operations section 4504 is arranged on the right of the large-sized expansion unit 4500. That is, when the image capturing apparatus body 1001 is in a state having the large-sized expansion unit 4500 is attached thereto, the LE operation section 4504 is located in the vicinity of the body rear-side operation section 1065. This enables the user to operate the LE operation section 4504 with a feeling similar to a feeling of operating the body rear-side operation section 1065, and hence the operability of the image capturing apparatus body 1001 is not lowered.

Further, when the image capturing apparatus body 1001 is in the state having the large-sized expansion unit 4500 is attached thereto, the LE operation section 4504 is disposed substantially on the same plane as the body operation section 1020 provided on the right cover unit 1004. Therefore, even in the state in which the large-sized expansion unit 4500 is attached to the image capturing apparatus body 1001, the operation sections are concentratedly arranged on the same side of the image capturing apparatus body 1001, which makes it possible to maintain high operability of the image capturing apparatus body 1001.

Note that the body rear-side operation section 1065 has a protuberant portion 1310 (see FIG. 12) which protrudes toward the rear than the rear-side mounting portions 1111. The front side of the large-sized expansion unit 4500 is provided with a recess 1320 (see FIG. 35) for accommodating the protuberant portion 1310 so as to prevent the protuberant portion 1310 from interfering with the large-sized expansion unit 4500. This makes it possible to prevent the user from inadvertently pushing the body rear-side operation section 1065 when the large-sized expansion unit 4500 is attached to the image capturing apparatus body 1001.

Figure 44:
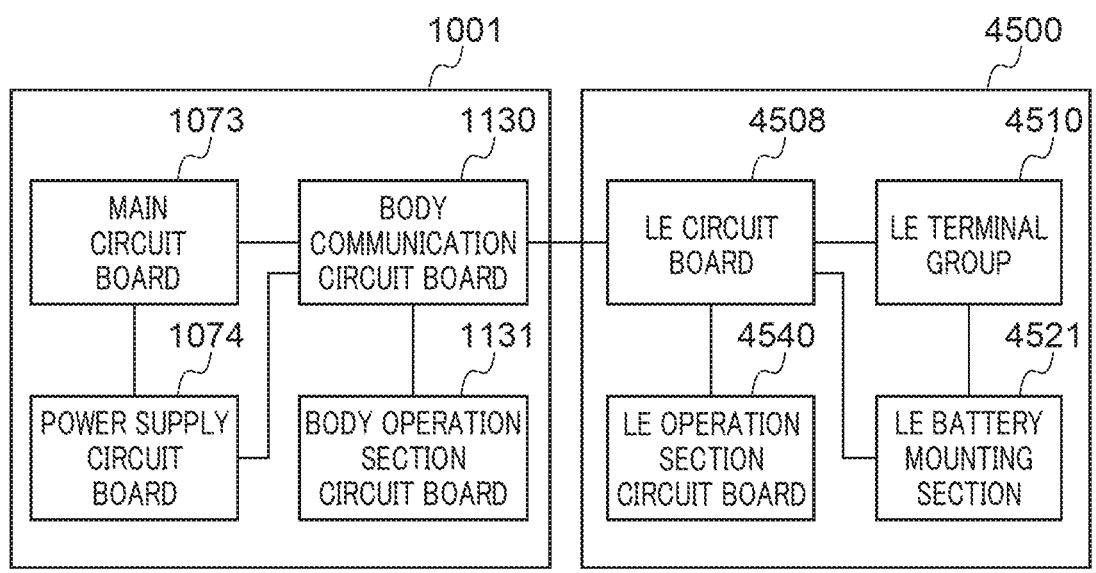
FIG. 44 is a partial functional block diagram of the image capturing apparatus body and the large-sized expansion unit.

FIG. 44 is a partial functional block diagram of the image capturing apparatus body 1001 and the large-sized expansion unit 4500. When the large-sized expansion unit 4500 is attached to the image capturing apparatus body 1001, the expansion connector 1112 mounted on the body communication circuit board 1130 and the LE connector 4501 mounted on the LE circuit board 4508 are electrically connected to each other. Then, the CPU 2020 mounted on the main circuit board 1073 of the image capturing apparatus body 1001 detects attachment of the large-sized expansion unit 4500 and is capable of transmitting video data and audio data, and the GEN lock signal, to the LE terminal group 4510 of the large-sized expansion unit 4500. Further, when the expansion module battery is connected to the LE battery mounting section 4521 of the large-sized expansion unit 4500, it is possible to supply power to the image capturing apparatus body 1001 via the LE circuit board 4508.

Signals generated on the LE operation section circuit board 4540 by operations performed on the LE operation section 4504 of the large-sized expansion unit 4500 are transmitted to the body communication circuit board 1130 of the image capturing apparatus body 1001 via the LE circuit board 4508. Then, the signals are converted by an internal circuit of the body communication circuit board 1130 to signals common to the input signals to the body operation section circuit board 1131, and these signals are transmitted from the body communication circuit board 1130 to the main circuit board 1073. Thus, by converting the signals from the large-sized expansion unit 4500 to the common signals, it is possible to reduce the number of pins of the inter-board connection wires 1133.

Although in the embodiment described heretofore, as the function expansion units removably attached to the image capturing apparatus body 1001, description is given by focusing on the VF unit 4000, the transmission unit 4100 and the large-sized expansion unit 4500, this is not limitative, but various other function expansion units, including a small-sized battery unit, can be also attached to the image capturing apparatus body 1001.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-150318, filed Aug. 20, 2019, which is hereby incorporated by reference herein in its entirety.

What is claimed is:

1. An image capturing apparatus comprising:
   an apparatus body; and
   an accessory removably attached to the apparatus body,
   wherein the apparatus body comprises:
      a first connection section disposed on a rear surface of the apparatus body and connectable to the accessory;
      a first operation member disposed in a side surface of the apparatus body;
      a second operation member disposed in the rear surface of the apparatus body; and
      a protuberant portion disposed on the rear surface of the apparatus body where the second operation member is disposed,
   wherein the accessory comprises:
      a second connection section connectable to the first connection section;
      a third operation member disposed in a surface different from a surface where the second connection section is disposed; and
      a recessed portion for accommodating the protuberant portion in a state where the accessory is attached to the rear surface of the apparatus body, and
   wherein the second operation member is inoperable in the state where the accessory is attached to the apparatus body.

2. The image capturing apparatus according to claim 1, wherein the first operation member and the third operation member are substantially on a same plane in the state where the accessory is attached to the apparatus body.

3. The image capturing apparatus according to claim 1, wherein the second operation member is disposed on the rear surface of the apparatus body, in the vicinity of the side surface of the apparatus body where the first operation member is disposed.

4. The image capturing apparatus according to claim 1, wherein the second operation member includes a switch that is vertically and laterally movable and that performs selection.

5. The image capturing apparatus according to claim 1, wherein at least one function of the third operation member and at least one function of the second operation member are the same.

6. The image capturing apparatus according to claim 1, wherein the third operation member is located in the vicinity of the second operation member in the state where the accessory is attached to the apparatus body.

* * * * *